United States Patent
Minakuchi et al.

(10) Patent No.: US 12,350,990 B2
(45) Date of Patent: Jul. 8, 2025

(54) GROUNDING LOAD ESTIMATION DEVICE, CONTROL DEVICE, AND GROUNDING LOAD ESTIMATION METHOD

(71) Applicant: HITACHI ASTEMO, LTD., Ibaraki-ken (JP)

(72) Inventors: Yuichiro Minakuchi, Ibaraki (JP); Vaibhav Gupta, Ibaraki (JP)

(73) Assignee: HITACHI ASTEMO, LTD., Ibaraki-ken (JP)

( * ) Notice: Subject to any disclaimer, the term of this patent is extended or adjusted under 35 U.S.C. 154(b) by 688 days.

(21) Appl. No.: 17/522,084

(22) Filed: Nov. 9, 2021

(65) Prior Publication Data

US 2022/0063366 A1 Mar. 3, 2022

Related U.S. Application Data

(63) Continuation of application No. PCT/JP2019/028203, filed on Jul. 18, 2019.

(30) Foreign Application Priority Data

Jun. 25, 2019 (JP) ................................. 2019-117696

(51) Int. Cl.
*B60G 17/019* (2006.01)
*B60W 30/02* (2012.01)
(Continued)

(52) U.S. Cl.
CPC ....... *B60G 17/01908* (2013.01); *B60W 30/02* (2013.01); *B60W 40/10* (2013.01);
(Continued)

(58) Field of Classification Search
CPC .......... B60G 17/0182; B60G 17/01908; B60G 17/08; B60G 2400/0523; B60G 2400/104;
(Continued)

(56) References Cited

U.S. PATENT DOCUMENTS

2005/0236782 A1\* 10/2005 Kobayashi ............. B60G 21/06
280/6.159
2009/0218881 A1 9/2009 Aizawa
(Continued)

FOREIGN PATENT DOCUMENTS

JP 2009-202780 9/2009
JP 2013-216278 10/2013
(Continued)

OTHER PUBLICATIONS

Office Action for JP Patent Application No. JP2019-117696, mailed Jan. 21, 2020, 5 pages.
(Continued)

*Primary Examiner* — Kyle R Quigley
(74) *Attorney, Agent, or Firm* — Casimir Jones, S.C.; Robert A. Goetz

(57) ABSTRACT

The present invention achieves a technique that not only makes it possible to reduce sensor-related cost but also makes it possible to estimate a ground contact load of a vehicle with sufficiently high accuracy. A ground contact load estimation device (100) causes an acquisition section to acquire a physical quantity related to a vehicle, causes a reference inertia load calculation section (111) to calculate a reference inertia load with use of the physical quantity, uses the physical quantity to cause a correction value calculation section (112) to calculate an inertia load correction value, and causes an inertia load estimation section (110) to estimate an inertia load by adding the inertia load correction value to the reference inertia load.

20 Claims, 6 Drawing Sheets

(51) Int. Cl.
*B60W 40/10* (2012.01)
*B60W 40/13* (2012.01)
*B62D 6/00* (2006.01)

(52) U.S. Cl.
CPC ............ *B60W 40/13* (2013.01); *B62D 6/00* (2013.01); *B60W 2040/1315* (2013.01); *B60W 2040/1323* (2013.01)

(58) Field of Classification Search
CPC ........ B60G 2400/106; B60G 2400/204; B60G 2400/208; B60G 2400/41; B60G 2400/64; B60G 2400/90; B60G 2500/10; B60G 2800/70; B60W 2040/1307; B60W 2040/1315; B60W 2040/1323; B60W 2050/0035; B60W 2520/105; B60W 2520/125; B60W 2520/14; B60W 2520/28; B60W 2530/10; B60W 2530/20; B60W 2530/201; B60W 2540/18; B60W 30/02; B60W 40/10; B60W 40/13; B62D 6/00
See application file for complete search history.

(56) References Cited

U.S. PATENT DOCUMENTS

2015/0267742 A1\* 9/2015 Hatakeyama ....... B60B 27/0005
 384/448
2019/0025113 A1\* 1/2019 Masago ................ G01G 19/03

FOREIGN PATENT DOCUMENTS

| JP | 2014-25767 | 2/2014 |
| JP | 2019-89504 | 6/2019 |
| JP | 2021-003950 | 1/2021 |

OTHER PUBLICATIONS

Office Action for JP Patent Application No. JP2019-117696, mailed Oct. 1, 2019, 5 pages.
International Preliminary Report on Patentability for Int'l Application No. PCT/JP2019/028203, mailed Oct. 8, 2019, 9 pages.
International Search Report for Int'l Patent Application No. PCT/JP2019/028203, mailed Oct. 8, 2019, 4 pages.

\* cited by examiner

Road surface

GROUNDING LOAD ESTIMATION DEVICE, CONTROL DEVICE, AND GROUNDING LOAD ESTIMATION METHOD

This application is a Continuation of PCT International Application No. PCT/JP2019/028203 filed in Japan on Jul. 18, 2019, which claims the benefit of Patent Application No. 2019-117696 filed in Japan on Jun. 25, 2019, the entire contents of which are hereby incorporated by reference.

TECHNICAL FIELD

The present invention relates to a ground contact load estimation device, a control device, and a ground contact load estimation method.

BACKGROUND ART

Conventionally, a technique is known in which a ground contact load at a wheel of a vehicle is estimated and a result of the estimation is used to control a braking force and a driving force of the vehicle so as to enhance running stability of the vehicle. The ground contact load is required to be estimated with sufficiently high accuracy from the viewpoint of enhancing running stability of the vehicle. Examples of a known technique for estimating the ground contact load include a technique in which (i) a rolling angular speed detected by a rolling rate sensor and (ii) a pitching angular speed detected by a pitching rate sensor are used to estimate a ground contact load (see, for example, Patent Literature 1).

CITATION LIST

Patent Literature

[Patent Literature 1]
Japanese Patent Application Publication Tokukai No. 2013-216278

SUMMARY OF INVENTION

Technical Problem

However, such a conventional technique as described earlier requires more sensors that are necessary for estimation of the ground contact load, such as the rolling rate sensor and the pitching rate sensor. This may cause an increase in cost. The conventional technique thus still has room for consideration from the viewpoint of at least a reduction in sensor-related cost.

An aspect of the present invention has an object to achieve a technique that not only makes it possible to reduce sensor-related cost but also makes it possible to estimate a ground contact load of a vehicle with sufficiently high accuracy.

Solution to Problem

In order to attain the object, a ground contact load estimation device in accordance with an aspect of the present invention is a ground contact load estimation device for estimating a ground contact load of a vehicle, the ground contact load estimation device including: an acquisition section configured to acquire a physical quantity related to the vehicle; and an inertia load estimation section including (i) a reference inertia load calculation section configured to calculate a reference inertia load with use of the physical quantity that has been acquired by the acquisition section and (ii) a correction value calculation section configured to calculate an inertia load correction value with use of the physical quantity that has been acquired by the acquisition section, the inertia load estimation section being configured to estimate an inertia load by adding the inertia load correction value to the reference inertia load.

Furthermore, in order to attain the object, a control device in accordance with an aspect of the present invention is a control device for estimating a ground contact load acting on a vehicle, and directly or indirectly using the ground contact load to control one or more other devices of the vehicle, the control device including: an acquisition section configured to acquire a physical quantity related to the vehicle; and an inertia load estimation section including (i) a reference inertia load calculation section configured to calculate a reference inertia load with use of the physical quantity that has been acquired by the acquisition section and (ii) a correction value calculation section configured to calculate an inertia load correction value with use of the physical quantity that has been acquired by the acquisition section, the inertia load estimation section being configured to estimate an inertia load by adding the inertia load correction value to the reference inertia load.

Moreover, in order to attain the object, a ground contact load estimation method in accordance with an aspect of the present invention is a ground contact load estimation method for estimating a ground contact load of a vehicle, the ground contact load estimation method comprising the steps of: acquiring a physical quantity related to the vehicle; calculating a reference inertia load with use of the physical quantity acquired; calculating an inertia load correction value with use of the physical quantity acquired; and estimating an inertia load by adding the inertia load correction value to the reference inertia load.

Advantageous Effects of Invention

An aspect of the present invention makes it possible to estimate a ground contact load of a vehicle with sufficiently high accuracy with use of a sensor that is widely used to control driving of the vehicle. It is therefore possible to reduce sensor-related cost and also estimate a ground contact load of a vehicle with sufficiently high accuracy.

DESCRIPTION OF EMBODIMENTS

Figure 1:
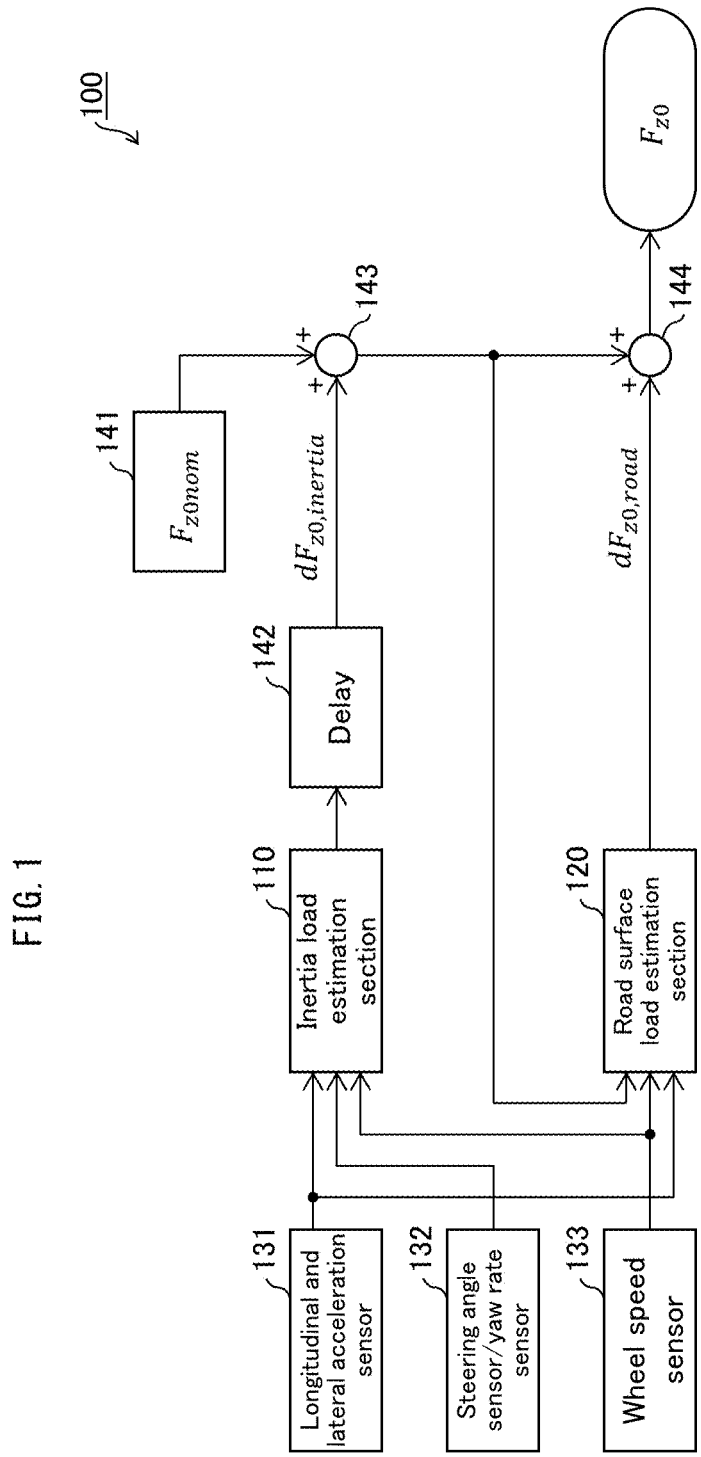
FIG. 1 is a block diagram illustrating an example of a functional configuration of a ground contact load estimation device in accordance with Embodiment 1 of the present invention.

According to an embodiment of the present invention, a ground contact load at a wheel of a vehicle is estimated with sufficiently high accuracy with reference to a physical quantity of the vehicle which physical quantity can be acquired with use of a sensor that is ordinarily used to carry out control for enhancing running stability of the vehicle. Note that the expression "with "reference" to a physical quantity" is herein a general term for direct or indirect use of the physical quantity and herein means direct and/or indirect use of the physical quantity.

[Ground Contact Load Estimation Device]

A ground contact load estimation device of an embodiment of the present invention estimates a ground contact load of a vehicle. The ground contact load estimation device includes an acquisition section and an inertia load estimation section.

[Acquisition Section]

The acquisition section is a device for acquiring a physical quantity related to a vehicle. The acquisition section supplies the physical quantity to the inertia load estimation section (described later) and a correction value calculation section (described later). Examples of the acquisition section include various sensors and a device for calculating and outputting the physical quantity.

According to the present embodiment, a sensor can be a sensor that is ordinarily used (hereinafter also referred to as a "universal sensor") to carry out standard control in relation to running of a vehicle. The sensor does not need to include a rolling rate sensor and a pitching rate sensor. Examples of the sensor (universal sensor) serving as the acquisition section include a longitudinal acceleration sensor that acquires longitudinal acceleration of the vehicle, a lateral acceleration sensor that acquires lateral acceleration of the vehicle, a wheel speed sensor that acquires a wheel angular speed of the vehicle, and a turning information sensor that acquires turning information of the vehicle. Examples of the turning information sensor include a yaw rate sensor and a steering angle sensor.

Examples of the above physical quantity include a value of the longitudinal acceleration sensor, a value of the lateral acceleration sensor, a value of the wheel speed sensor, a value of the turning information sensor, a mass of the vehicle, a gravitational center height of the vehicle, a rolling inertia moment, a pitching inertia moment, a front axle intercentroid distance of the vehicle, a rear axle intercentroid distance of the vehicle, a front tread length of the vehicle, and a rear tread length of the vehicle.

[Inertia Load Estimation Section]

The inertia load estimation section includes a reference inertia load calculation section and the correction value calculation section. The inertia load estimation section estimates an inertia load by adding an inertia load correction value calculated by the correction value calculation section to a reference inertia load calculated by the reference inertia load calculation section. The inertia load means a variation in ground contact load due to an effect of turning of the vehicle and an effect of acceleration/deceleration of the vehicle. The reference inertia load calculation section calculates the reference inertia load with use of the physical quantity that has been acquired by the acquisition section. The reference inertia load means a solution of an equation described later and representing the inertia load of the vehicle. The inertia load correction value is a correction value for correcting the reference inertia load so as to reduce a difference between the reference inertia load and a true inertia load.

According to the present embodiment, the physical quantity that is used to calculate the reference inertia load can be a physical quantity that is acquired by a universal sensor (described earlier) and a physical quantity that is specific to the vehicle. For example, the reference inertia load calculation section can calculate the reference inertia load at each wheel of the vehicle in accordance with a model of the vehicle with use of the value of the longitudinal acceleration sensor, the value of the lateral acceleration sensor, the mass of the vehicle, the gravitational center height of the vehicle, the rolling inertia moment, the pitching inertia moment, the front axle intercentroid distance of the vehicle, the rear axle intercentroid distance of the vehicle, the front tread length, and the rear tread length.

Note here that the "model of the vehicle" is a model for making it possible to calculate the reference inertia load. The model can be determined as appropriate in accordance with a mathematical expression for calculating the reference inertia load. For example, the model of the vehicle can be a model of a solution of a motion equation represented by a linear system, the solution being obtained by application of a minimum norm solution.

The correction value calculation section calculates the inertia load correction value with use of the physical quantity that has been acquired by the acquisition section. The physical quantity that is used by the correction value calculation section to calculate the inertia load correction value can also be a physical quantity that is acquired by a universal sensor and a physical quantity that is specific to the vehicle, as described earlier. For example, the correction value calculation section can calculate the inertia load correction value with use of the mass of the vehicle, the gravitational center height of the vehicle, the value of the wheel speed sensor, the value of the turning information sensor, the rolling inertia moment, the front tread length, and the rear tread length. The value of the turning information sensor can be suitably a value of the yaw rate sensor or a value of the steering angle sensor.

[Road Surface Load Estimation Section]

The ground contact load estimation device of the present embodiment can have a further configuration provided that effects of the present invention can be obtained. For example, the ground contact load estimation device can further include a road surface load estimation section configured to estimate a road surface load of the vehicle.

The road surface load means a variation in ground contact load due to an effect of a road surface, such as unevenness of the road surface. In order to reduce cost of the acquisition section (e.g., a sensor) for estimation of the road surface load, the road surface load estimation section is preferably configured to estimate the road surface load with use of the physical quantity that is acquired by a universal sensor and the physical quantity that is specific to the vehicle. Note, however, that the configuration of the road surface load estimation section is not limited to this. For example, the road surface load estimation section preferably estimates the road surface load by multiplying a tire effective radius variation (described below) by a first gain. In this case, the acquisition section (described earlier) preferably includes a wheel speed sensor that acquires the wheel angular speed of the vehicle, and is preferably a device for acquiring the physical quantity including the wheel angular speed, a steady load of the vehicle, and an inertia load of the vehicle.

The road surface load estimation section includes a first gain calculation section and a tire effective radius variation calculation section. The first gain calculation section calculates the first gain from at least the steady load of the vehicle and the inertia load of the vehicle. The first gain is, at least, a parameter indicative of rigidity of a wheel (e.g., a tire) of the vehicle. The first gain is a value that is unique to a wheel. As described later, the first gain can be found from an equation that substantially represents rigidity of the wheel to which a specific ground contact load is applied.

The tire effective radius variation calculation section calculates the tire effective radius variation by multiplying a variation in wheel angular speed by a second gain. The tire effective radius variation is a value that represents, with use of a variation in wheel speed, a variation in radius of a tire due to an influence of the road surface. The variation in wheel angular speed can be found with reference to a result of detection by the wheel speed sensor. The variation in wheel angular speed only needs to substantially represent a variation in wheel angular speed which variation is caused during a step of estimating a ground contact load, and can be an approximate value of the variation.

The second gain is a parameter for reducing an influence of the variation in wheel angular speed on an estimation result. In general, in estimation of a state quantity of the vehicle (e.g., a ground contact load of the vehicle), a result of the estimation and an actual running state tend to differ more greatly as a condition concerning actual running of the vehicle further deviates from a predetermined condition concerning ordinary running of the vehicle. The second gain can be determined by deriving, through experiment or simulation, for example, a suitable numerical value such that an estimated value of the ground contact load is substantially identical to an actual measured value of the ground contact load of the vehicle under various conditions that are assumed concerning running of the vehicle.

The road surface load estimation section can include a further configuration provided that the effects of the present embodiment can be obtained. For example, the road surface load estimation section can further include a second gain correction section.

The second gain correction section calculates a slip ratio-related value of the vehicle from the value of the wheel speed sensor so as to correct the second gain in accordance with at least the slip ratio-related value and a jerk of the vehicle. In this case, the acquisition section further acquires the jerk of the vehicle. The jerk can be acquired by, for example, an acceleration sensor.

[Method for Estimating Ground Contact Load]

According to the present embodiment, a ground contact load of a vehicle can be estimated by a method including the steps of: acquiring a physical quantity related to the vehicle; calculating a reference inertia load with use of the physical quantity that has been acquired by the acquisition section; calculating an inertia load correction value with use of the physical quantity that has been acquired by the acquisition section; and calculating an inertia load by adding the inertia load correction value to the reference inertia load. The method for estimating the ground contact load of the vehicle can be carried out with use of the ground contact load estimation device (described earlier).

According to the present embodiment, an estimated value of the ground contact load of the vehicle is obtained by adding together (i) the inertia load that has been estimated by the inertia load estimation section and (ii) the steady load of the vehicle. The steady load is a ground contact load at 1 G of the vehicle. For example, the steady load can be a calculated value that is based on the mass of the vehicle, or can be a constant that is specific to the vehicle. In a case where the ground contact load estimation device further includes the road surface load estimation section, an estimated value of the ground contact load of the vehicle can be obtained by adding together (i) the inertia load that has been estimated by the inertia load estimation section, (ii) the road surface load that has been estimated by the road surface load estimation section, and (iii) the steady load.

[Control Device]

A control device of an embodiment of the present invention estimates a ground contact load acting on a vehicle, and directly or indirectly uses the ground contact load to control one or more other devices of the vehicle. The control device of the present embodiment can be configured as in the case of a publicly known device for controlling one or more devices of the vehicle in accordance with a ground contact load, except that the control device includes the ground contact load estimation device (described earlier). Note that a case where the ground contact load is indirectly used includes, for example, a configuration in which the ground contact load estimated is used to carry out further estimation and use a value of a result of the further estimation to control the other device(s).

An embodiment of the present invention will be specifically described below.

Embodiment 1: First Embodiment of Ground Contact Load Estimation Device

[Functional Configuration of Ground Contact Load Estimation Device]

FIG. 1 is a block diagram illustrating an example of a functional configuration of a ground contact load estimation device in accordance with Embodiment 1 of the present invention. As illustrated in FIG. 1, a ground contact load estimation device 100 includes an inertia load estimation section 110, a road surface load estimation section 120, a longitudinal acceleration sensor and lateral acceleration sensor (longitudinal and lateral acceleration sensor) 131, a steering angle sensor or yaw rate sensor (steering angle/yaw rate sensor) 132, a wheel speed sensor 133, a steady load providing section 141, a delaying section 142, and adding sections 143 and 144.

The longitudinal and lateral acceleration sensor 131, the steering angle/yaw rate sensor 132, and the wheel speed sensor 133 are connected to the inertia load estimation section 110. The longitudinal and lateral acceleration sensor 131 and the wheel speed sensor 133 are connected to the road surface load estimation section 120. The longitudinal and lateral acceleration sensor 131, the steering angle/yaw rate sensor 132, and the wheel speed sensor 133 (i) provide a physical quantity related to a vehicle and to be acquired by the inertia load estimation section 110 and (ii) serve as an acquisition section with respect to the inertia load estimation section 110.

The inertia load estimation section 110 outputs a signal of a calculated inertia load. The inertia load estimation section 110 is connected to the adding section 143 via the delaying section 142. The steady load providing section 141 outputs a signal of a steady load. The steady load providing section 141 is also connected to the adding section 143. The adding section 143 is connected to each of the adding section 144 and the road surface load estimation section 120. The road surface load estimation section 120 is connected to the adding section 144.

The longitudinal and lateral acceleration sensor 131, the steering angle/yaw rate sensor 132, the wheel speed sensor 133, the steady load providing section 141, and the inertia load estimation section 110 (i) provide the physical quantity related to the vehicle and to be acquired by the road surface load estimation section 120 and (ii) serve as an acquisition section with respect to the road surface load estimation section 120.

Furthermore, the inertia load estimation section 110 and the road surface load estimation section 120 are each connected to a network of a control system of the vehicle (e.g., CAN (described later)), though not illustrated. The inertia load estimation section 110 and the road surface load estimation section 120 acquire, via such a network, the physical quantity that is specific to the vehicle, such as a mass of the vehicle, a gravitational center height of the vehicle, a rolling inertia moment measured with respect to a point on a road surface which point corresponds to the center of gravity of the vehicle, a pitching inertia moment measured with respect to the point on the road surface, a front axle intercentroid distance, a rear axle intercentroid distance, a front tread length, and a rear tread length. The network also corresponds to an acquisition section of Embodiment 1.

Figure 2:
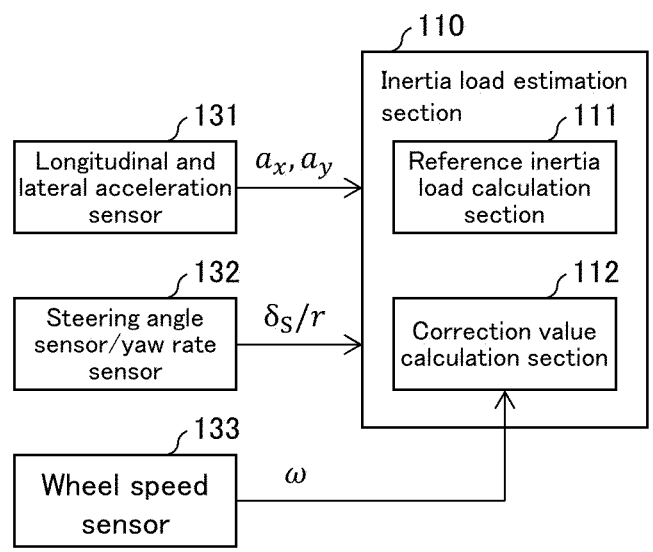
FIG. 2 is a block diagram illustrating an example of a functional configuration of an inertia load estimation section of Embodiment 1 of the present invention.

FIG. 2 is a block diagram illustrating an example of a functional configuration of an inertia load estimation section of Embodiment 1 of the present invention. As illustrated in FIG. 2, the inertia load estimation section 110 includes a reference inertia load calculation section 111 and a correction value calculation section 112.

Figure 3:
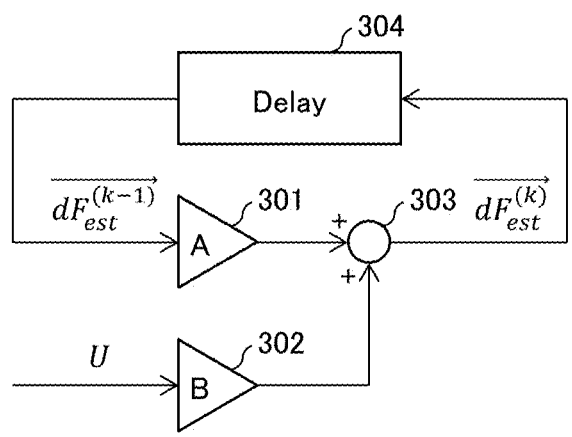
FIG. 3 is a block diagram illustrating an example of a functional configuration of a reference inertia load calculation section of Embodiment 1 of the present invention.

FIG. 3 is a block diagram illustrating an example of a functional configuration of a reference inertia load calculation section of Embodiment 1 of the present invention. As illustrated in FIG. 3, the reference inertia load calculation section 111 includes a system matrix section 301, an input matrix section 302, an adding section 303, and a delaying section 304. The system matrix section 301 is connected to the adding section 303, the adding section 303 is connected to the delaying section 304, and the delaying section 304 is connected to the system matrix section 301. The input matrix section 302 is connected to an outside, for example, the network (described earlier), and is connected to the adding section 303.

The road surface load estimation section 120 is constituted by a publicly known device for estimating a road surface load. For example, the road surface load estimation section 120 is a device for estimating a road surface load from, for example, an image that has been captured by a camera (not illustrated).

[Logic of Estimation of Ground Contact Load]

A ground contact load of Embodiment 1 is represented by Equation (1) below. In Equation (1), $F_{z0nom}$ represents the ground contact load in a 1 G state, $dF_{z0,inertia}$ represents the inertia load, and $dF_{z0,road}$ represents the road surface load. As described earlier, the inertia load means a variation in ground contact load due to an effect of turning of the vehicle and an effect of acceleration/deceleration of the vehicle, and the road surface load means a variation in ground contact load due to an effect of a road surface, such as unevenness of the road surface.

$$F_{z0} = F_{z0nom} + dF_{z0,inertia} + dF_{z0,road} \quad (1)$$

Figure 4:
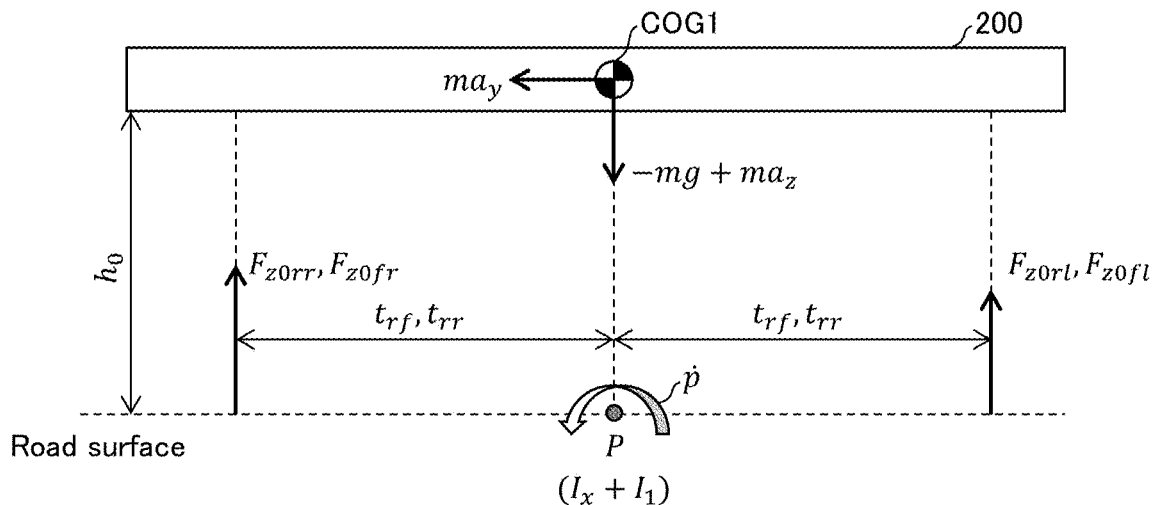
FIG. 4 is a view for describing a physical quantity related to a rolling behavior of a vehicle body.
Figure 5:
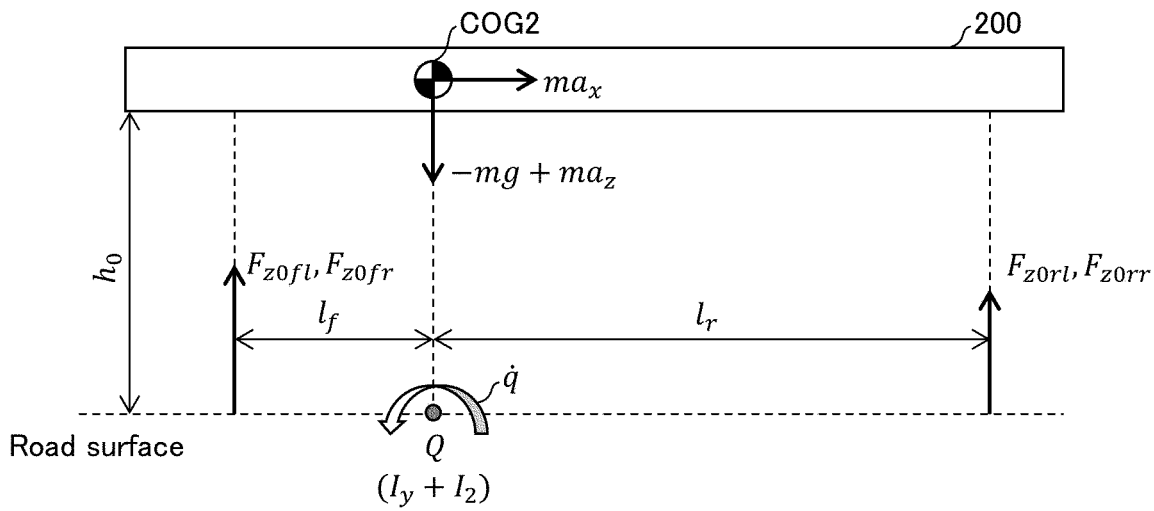
FIG. 5 is a view for describing a physical quantity related to a pitching behavior of a vehicle body.
Figure 6:
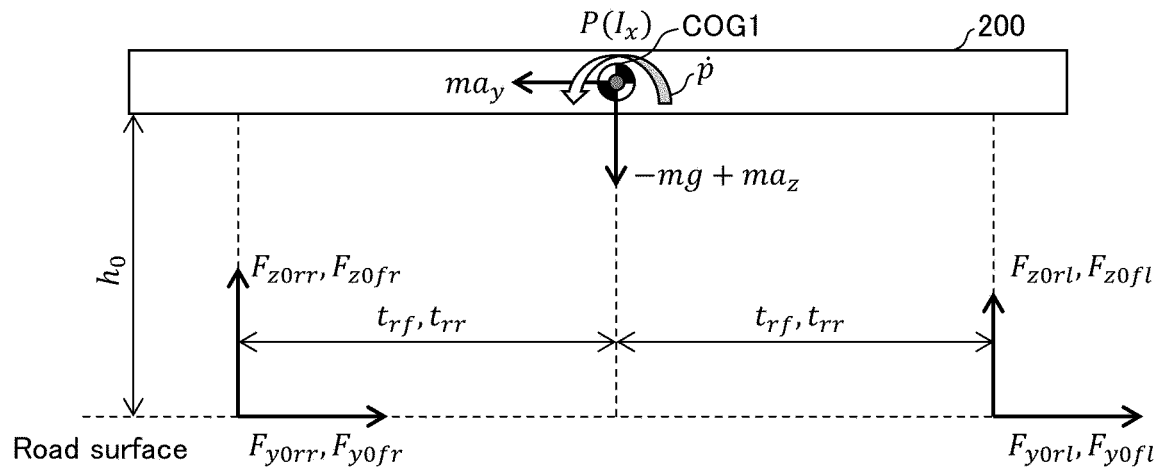
FIG. 6 is a view for describing rolling angular acceleration around the center of gravity of a vehicle body.

FIG. 4 is a view for describing a physical quantity related to a rolling behavior of a vehicle body. FIG. 5 is a view for describing a physical quantity related to a pitching behavior of a vehicle body. FIG. 6 is a view for describing rolling angular acceleration around the center of gravity of a vehicle body.

$dF_{z0,inertia}$ is represented by three motion equations of Equations (2A), (2B), and (2C) below. Equation (2A) represents motion in a vertical direction, Equation (2B) represents the rolling behavior, and Equation (2C) represents the pitching behavior. Regarding a position of a wheel, the front, the rear, the right, and the left are herein expressed as "f", "r", "r", and "l", respectively. Regarding a direction with respect to the vehicle, a longitudinal direction, a lateral direction, and the vertical direction are expressed as "x", "y", and "z", respectively.

$$dF_{z0ff} + dF_{z0fr} + dF_{z0rl} + dF_{z0rr} = ma_z \quad (2A)$$

$$t_{rf}(dF_{z0ff} - dF_{z0fr}) + t_{rr}(dF_{z0rl} - dF_{z0rr}) = (I_x + I_1)\dot{p} - ma_y h_0 \quad (2B)$$

$$-l_f(dF_{z0ff} + dF_{z0fr}) + l_r(dF_{z0rl} - dF_{z0rr}) = (I_y + I_2)\dot{q} + ma_x h_0 \quad (2C)$$

As illustrated in FIGS. 4 and 5, m represents the mass of the vehicle, $h_0$ represents the gravitational center height of the vehicle. $a_x$ represents longitudinal acceleration of the vehicle. $a_y$ represents lateral acceleration of the vehicle. $a_z$ represents vertical acceleration of the vehicle. $I_1$ and $I_2$ represent correction values for calculating inertia moments around road surface points with use of inertia moments around axes passing through respective centers of gravity COG1 and COG2. The center of gravity COG1 represents a center of gravity in the width direction of a vehicle body 200, and the center of gravity COG2 represents a center of gravity in the longitudinal direction of the vehicle body 200.

Furthermore, as illustrated in FIG. 4, $(I_x+I_1)$ represents the rolling inertia moment around the road surface point, $I_x$ represents the inertia moment around the rolling axis passing through the center of gravity COG1, $t_{rr}$ represents half the length of a rear tread of the vehicle (the rear tread length multiplied by ½), and $t_{rf}$ represents half the length of a front tread of the vehicle (the front tread length multiplied by ½). Dotted p represents rolling angular acceleration around the road surface point.

Moreover, as illustrated in FIG. 5, $(I_y+I_2)$ represents the pitching inertia moment around the road surface point, and $I_y$ represents the inertia moment around the pitching axis passing through the center of gravity COG2. $l_f$ represents a longitudinal distance between the center of gravity COG2 and a front axle of the vehicle body 200, $l_r$ represents a distance between the center of gravity COG2 and a rear axle, and $(l_f+l_r)$ represents a wheelbase. Dotted q represents pitching angular acceleration around the road surface point.

Assuming that $dF_{est}^{(k)}$ is a calculated value of the variation in ground contact load at a given point in time, a vector thereof is represented by Equation (3) below. In the following Equation (3), k represents the number of times of calculation.

$$\overrightarrow{dF_{est}^{(k)}} = \overrightarrow{dF_{z0}^{(k)}} = [dF_{z0ff} dF_{z0fr} dF_{z0rl} dF_{z0rr}]^T \quad (3)$$

A matrix into which Equations (2A) to (2C) are transformed is represented by Equation (4) below, and Equation (5) below is derived from Equation (4). A 3×3 matrix on the right side of Equation (5) is also referred to as a matrix K', and a 3×1 matrix in parentheses on the right side of Equation (5) is also referred to as a matrix a'.

$$\begin{bmatrix} 1 & 1 & 1 \\ -t_{rf} & t_{rr} & -t_{rr} \\ -l_f & l_r & l_r \end{bmatrix} \begin{bmatrix} dF_{z0fr} \\ dF_{z0r1} \\ dF_{z0rr} \end{bmatrix} = \begin{bmatrix} ma_z \\ (I_x + I_1)\dot{p} - ma_y h_0 \\ (I_y + I_2)\dot{q} + ma_x h_0 \end{bmatrix} - \begin{bmatrix} 1 \\ t_{rf} \\ -l_f \end{bmatrix} dF_{z0f1} \quad (4)$$

$$\begin{bmatrix} dF_{z0fr} \\ dF_{z0r1} \\ dF_{z0rr} \end{bmatrix} = \overbrace{\begin{bmatrix} \dfrac{t_r}{l_f + l_r} & 0 & -\dfrac{1}{l_f + l_r} \\ \dfrac{l_f t_{rr} + l_r t_{rf}}{2t_{rr}(l_f + l_r)} & \dfrac{1}{2t_{rr}} & -\dfrac{t_{rf} - t_{rr}}{2t_{rr}(l_f + l_r)} \\ \dfrac{l_f t_{rr} - l_r t_{rf}}{2t_{rr}(l_f + l_r)} & -\dfrac{1}{2t_{rr}} & \dfrac{t_{rf} + t_{rr}}{2t_{rr}(l_f + l_r)} \end{bmatrix}}^{K'} \left( \begin{bmatrix} ma_z \\ (I_x + I_1)\dot{p} - ma_y h_0 \\ (I_y + I_2)\dot{q} + ma_x h_0 \end{bmatrix} - \overbrace{\begin{bmatrix} 1 \\ t_{rf} \\ -l_f \end{bmatrix}}^{a'} dF_{z0f1} \right) \quad (5)$$

Assuming here that "$dF_{z0fl}$" is "Z", Equation (3) is represented by Equation (6) below. Z is a variable satisfying Equations (2A) to (2C). A 4×1 matrix in the first term on the right side of Equation (6) represents a vector a. A 4×3 matrix in the second term on the right side of Equation (6) is also referred to as a matrix K, and a 3×1 matrix in that term is also referred to as a matrix U. The vector a is represented by a matrix of Equation (7) with use of the matrix K' and the matrix a' in Equation (5). The matrix K in Equation (6) is represented by a matrix of Equation (8) with use of the matrix K' in Equation (5).

$$\overrightarrow{dF_{est}^{(k)}} = \begin{bmatrix} dF_{z0f1} \\ dF_{z0fr} \\ dF_{z0r1} \\ dF_{z0rr} \end{bmatrix} = \underbrace{\begin{bmatrix} 1 \\ -1 \\ -\dfrac{t_{rf}}{t_{rr}} \\ \dfrac{t_{rf}}{l_{rr}} \end{bmatrix}}_{\vec{a}} Z + \underbrace{\begin{bmatrix} 0 & 0 & 0 \\ \dfrac{l_r}{l_f + l_r} & 0 & -\dfrac{1}{l_f + l_r} \\ \dfrac{l_f t_{rr} + l_r t_{rf}}{2t_{rr}(l_f + l_r)} & \dfrac{1}{2t_{rr}} & -\dfrac{t_{rf} - t_{rr}}{2t_{rr}(l_f + l_r)} \\ \dfrac{l_f t_{rr} - l_r t_{rf}}{2t_{rr}(l_f + l_r)} & -\dfrac{1}{2t_{rr}} & \dfrac{t_{rf} + t_{rr}}{2t_{rr}(l_f + l_r)} \end{bmatrix}}_{K} \underbrace{\begin{bmatrix} ma_z \\ (I_x + I_1)\dot{p} - ma_y h_0 \\ (I_y + I_2)\dot{q} + ma_x h_0 \end{bmatrix}}_{U} \quad (6)$$

$$\overrightarrow{dF_{est,p}}$$

$$\vec{a} = \begin{bmatrix} 1 \\ -K'a' \end{bmatrix} \quad (7)$$

$$K = \begin{bmatrix} 0 \\ K' \end{bmatrix} \quad (8)$$

Assuming that a vector $dF_{est,p}$ is the product of the matrix K and the matrix U on the right side of Equation (6), Equation (6) is represented by Equation (9) below. $dF_{est,p}$ represents any solution of Equations (2A) to (2C). The motion equations (2A) to (2C) (described earlier) are thus represented by Equation (9). That is, the solution of the motion equations (2A) to (2C) is represented by a linear equation, and a calculated value of the ground contact load to be found is present in any of straight lines represented by the linear equation.

$$\overrightarrow{dF_{est}^{(k)}} = \overrightarrow{dF_{est,p}} + \vec{a} Z \quad (9)$$

<Application of Minimum Norm Solution>

In the motion equations (2A) to (2C), there are four variables ($dF_{z0fl}$, $dF_{z0fr}$, $dF_{z0rl}$, and $dF_{z0rr}$), and there are three equations with respect to those variables. In view of this, a minimum norm solution is applied to Equation (9). A condition represented by Expression (10) below, i.e., a value of a solution that is included in solutions of the motion equations and whose difference from a previously calculated value of the variation in ground contact load is minimized is defined as the solution of Equation (9). In Expression (10), $dF_{est}^{(k-1)}$ represents the previously calculated value of the ground contact load. $dF_{est,p}$ represents any of the solutions of the motion equations.

$$\text{Minimize} \| \overrightarrow{dF_{est}^{(k-1)}} - \overrightarrow{dF_{est}^{(k)}} \| \quad (10)$$

Application of the above definition allows Equation (11) to be derived from Equation (9) as shown below. In Equation (11), hatted a represents a unit vector of the vector a.

$$\overrightarrow{dF_{est}^{(k)}} = \overrightarrow{dF_{est,p}} + \vec{a} Z \quad (11)$$

$$= \overrightarrow{dF_{est,p}} + \frac{\vec{a}}{|\vec{a}|} \left( \left( \overrightarrow{dF_{est}^{(k-1)}} - \overrightarrow{dF_{est,p}} \right) \cdot \hat{a} \right)$$

$$= \overrightarrow{dF_{est,p}} + \frac{\vec{a}}{|\vec{a}|^2} \left( \left( \overrightarrow{dF_{est}^{(k-1)}} - \overrightarrow{dF_{est,p}} \right) \cdot \vec{a} \right)$$

<Linear Modeling>

Equation (11) that is expressed by a linear model is represented by Equation (12) below and is further represented by Equation (13).

$$\overrightarrow{dF_{est}^{(k)}} = \underbrace{\left( \frac{aa^T}{|\vec{a}|^2} \right)}_{A} \overrightarrow{dF_{est}^{(k-1)}} + \underbrace{\left( I - \frac{aa^T}{|\vec{a}|^2} K \right)}_{B} U \quad (12)$$

$$\overrightarrow{dF_{est}^{(k)}} = A \overrightarrow{dF_{est}^{(k-1)}} + BU \quad (13)$$

In the above equations, U represents an input value, A represents a system matrix, and B represents an input matrix. The vector $dF_{est,p}$ is represented by the product of the matrix K and the matrix U as shown below. The matrix K and the matrix U are represented as below, and A and B are each represented as below with use of a matrix.

$$\overrightarrow{dF_{est,p}} = KU$$

$$K = \begin{bmatrix} 0 & 0 & 0 \\ \dfrac{l_r}{l_f + l_r} & 0 & -\dfrac{1}{l_f + l_r} \\ \dfrac{l_f t_{rr} + l_r t_{rf}}{2t_{rr}(l_f + l_r)} & \dfrac{1}{2t_{rr}} & -\dfrac{t_{rf} - t_{rr}}{2l_{rr}(l_f + l_r)} \\ \dfrac{l_f t_{rr} + l_r t_{rf}}{2t_{rr}(l_f + l_r)} & -\dfrac{1}{2t_{rr}} & \dfrac{t_{rf} + t_{rr}}{2t_{rr}(l_f + l_r)} \end{bmatrix}$$

$$U = \begin{bmatrix} ma_z \\ (I_x + I_1)\dot{p} - ma_y h_0 \\ (I_y + I_2)\dot{q} - ma_x h_0 \end{bmatrix}$$

-continued $$A = \frac{aa^T}{|\vec{a}|^2} = \frac{1}{2(t_{rf}^2 + t_{rr}^2)} \begin{bmatrix} t_{rr}^2 & -t_{rr}^2 & -t_{rf}t_{rr} & t_{rf}t_{rr} \\ -t_{rr}^2 & t_{rr}^2 & t_{rf}t_{rr} & -t_{rf}t_{rr} \\ -t_{rf}t_{rr} & t_{rf}t_{rr} & t_{rf}^2 & -t_{rf}^2 \\ t_{rf}t_{rr} & -t_{rf}t_{rr} & -t_{rf}^2 & t_{rf}^2 \end{bmatrix}$$

$$B = \left(I - \frac{aa^T}{|\vec{a}|^2}\right)K = \frac{1}{2}\begin{bmatrix} \frac{l_r}{l_f+l_r} & \frac{t_{rf}}{t_{rf}^2+t_{rr}^2} & \frac{-1}{l_f+l_r} \\ \frac{l_r}{l_f+l_r} & \frac{-t_{rf}}{t_{rf}^2+t_{rr}^2} & \frac{-1}{l_f+l_r} \\ \frac{l_r}{l_f+l_r} & \frac{t_{rr}}{t_{rf}^2+t_{rr}^2} & \frac{1}{l_f+l_r} \\ \frac{l_r}{l_f+l_r} & \frac{-t_{rr}}{t_{rf}^2+t_{rr}^2} & \frac{1}{l_f+l_r} \end{bmatrix}$$

The variable $dF_{est}^{(k)}$ to be found can be acquired by substituting the matrix U in Equation (13) (described earlier), which is the linear model.

<Calculation of Correction Value>

The matrix U includes vertical acceleration $a_z$, rolling angular acceleration dotted p, and pitching angular acceleration dotted q that are not calculated from a detected value of the universal sensor (described earlier). A solution of Equation (13) can be found by substituting a predetermined value (e.g., zero) in these accelerations. Meanwhile, however, it is necessary to correct an influence of $a_z$, dotted p, and dotted q.

"$dF_{est}^{(k)}$" to be corrected is hereinafter also referred to as a "reference inertia load", and a correction value for correcting the influence of $a_z$, dotted p, and dotted q is hereinafter also referred to as an "inertia load correction value" and is represented by "$dF_{Z0,corr}$". "$dF_{Z0,inertia}$", which is an inertia load to be found, is represented by Equation (14) below. Note that an initial value $dF_{est}(0)$ of the reference inertia load is set to "0".

$$\overrightarrow{dF_{z0,inertia}} = \overrightarrow{dF_{est}^{(k)}} + \overrightarrow{dF_{z0,corr}} \qquad (14)$$

(Correction of Influence of Rolling Angular Acceleration (Dotted p))

The inertia load correction value can be calculated from an appropriate equation corresponding to the extent and frequency of the influence of $a_z$, dotted p, and dotted q with use of a physical quantity that can be acquired from the universal sensor. For example, the inertia load correction value $dF_{Z0,corr}$ is represented by Equation (15) below. In Equation (15), $K_p$ represents an adjustment parameter, and $\Sigma F_{y0}$ represents the sum total of tire lateral forces measured during rolling of the vehicle. A vector p is represented by Equation (16). A part (except $\Sigma F_{y0}$) of the right side of Equation (15) corrects the influence of dotted p and is important during turning of the vehicle. For example, $K_p$ can be determined by (i) comparing (a) an actual measured value of the ground contact load of the vehicle that is turning with (b) an estimated value of the ground contact load that is estimated with use of Equation (15) and (ii) setting $K_p$ as appropriate so that the estimated value is substantially effective even under a condition that is extended from a running condition of the vehicle that has been subjected to the measurement of the actual measured value.

$$\overrightarrow{dF_{z0,corr}} = \sum \mathcal{F}_{y0} \cdot K_p \left(\frac{h_0 t_{rr}}{2(t_{rf}^2 + t_{rr}^2)}\right)\left(1 + \frac{l_1}{l_x}\right)\vec{p} \qquad (15)$$

$$\vec{p} = \begin{bmatrix} \frac{t_{rf}}{t_{rr}} & -\frac{t_{rf}}{t_{rr}} & 1 & -1 \end{bmatrix}^T \qquad (16)$$

Note here that the influence of dotted p which influence is expressed as "e dotted p" is represented by Equation (17) below. The left side of Equation (17) is "e dotted p", which is the influence of dotted p. The 3×1 matrix by which B in Equation (17) is multiplied is a matrix in which $a_x$, $a_y$, $a_z$, and dotted q are all set to zero in the matrix U (described earlier).

$$e_{\dot{p}} = B\begin{bmatrix} 0 \\ (I_x + I_1)\dot{p} \\ 0 \end{bmatrix} = \left(\frac{(I_x + I_1)t_{rr}}{2(t_{rf}^2 + t_{rr}^2)}\right)\dot{p}\begin{bmatrix} \frac{t_{rf}}{t_{rr}} \\ -\frac{t_{rf}}{t_{rr}} \\ 1 \\ -1 \end{bmatrix} \qquad (17)$$

$$= \left(\frac{(I_x + I_1)t_{rr}}{2(t_{rf}^2 + t_{rr}^2)}\right)\dot{p}\vec{p}$$

Note here that FIG. 6 is a view for describing rolling angular acceleration around the center of gravity of a vehicle body. As illustrated in FIG. 6, dotted p in FIG. 6 represents a rolling angular speed around the center of gravity COG1 of the vehicle body. This dotted p around the center of gravity of the vehicle body is represented by Equation (18) below. The product of matrices on the right side of Equation (18) is so minute as to be negligible and can therefore be regarded as zero.

$$I_x \dot{p} = \sum F_{y0} h_0 + \begin{bmatrix} t_{rf} & -t_{rf} & t_{rr} & -t_{rr} \end{bmatrix}\begin{bmatrix} F_{z0fl} \\ F_{z0fr} \\ F_{z0rl} \\ F_{z0rr} \end{bmatrix} \qquad (18)$$

Figure 7:
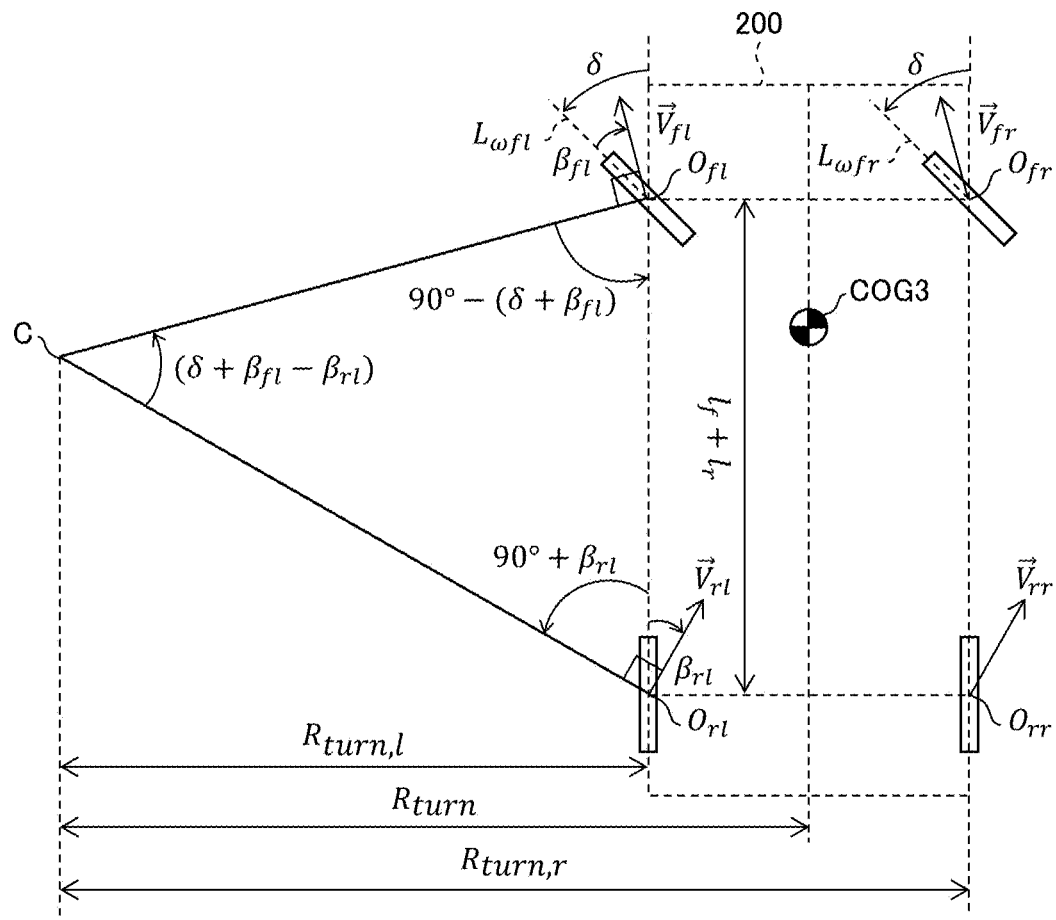
FIG. 7 is a view for describing a turning radius of a vehicle.

$\Sigma F_{y0}$ is represented by Equation (19). Note here that FIG. 7 is a view for describing a turning radius with respect to an actual steering angle of a vehicle. FIG. 7 illustrates a case where the vehicle turns to the left. FIG. 7 illustrates turning of the vehicle that is steered by front wheels only. In FIG. 7, C is a turning center, and O is a wheel central point. "$R_{turn}$" represents a turning radius and is a distance from the turning center C to a center of gravity COG3 of the vehicle. "$R_{turn,l}$" represents a distance from the turning center C in the width direction of the vehicle body to an intersection O of the wheel on the left side of the vehicle, and "$R_{turn,r}$" represents a distance from the turning center C in the width direction of the vehicle body to an intersection O of the wheel on the right side of the vehicle. δ is the actual steering angle.

A $V_{fl}$ vector and a $V_{fr}$ vector are travelling direction vectors at front wheel points, and $\beta_{fl}$ and $\beta_{fr}$ are front wheel slip angles. $\beta_{fl}$ is represented by an angle that is made by the $V_{fl}$ vector with respect to a line $L\omega_{fl}$, and $\beta_{fr}$ is represented by an angle that is made by the $V_{fr}$ vector with respect to a line $L\omega_{fr}$. A broken line Lon is a line extending in a rolling direction of the wheel and is a straight line passing through a center $O_{fl}$ of the wheel. A broken line $L\omega_{fr}$ is a line extending in the rolling direction of the wheel and is a straight line passing through a center $O_{fr}$ of the wheel. A $V_{fl}$ vector and a $V_{rr}$ vector are travelling direction vectors at rear wheel points. $\beta_{rl}$ and $\beta_{rr}$ are rear wheel slip angles, and are represented by angles made by the $V_{rl}$ vector and the $V_{rr}$ vector, respectively, with respect to the longitudinal direction of the vehicle body 200. In a case where the vehicle is steered by both the front wheels and rear wheels, $\beta_{fl}$ and $\beta_{fr}$ are corrected as appropriate in consideration of steering by the rear wheels.

Given that "$R_{turn}$" in Equation (19) is represented by Equation (20), Equation (19) is represented by Equation (21). "$R_{turn}$" will be described later. In Equation (21) below, "u" is an average of peripheral speeds of all the wheels and is represented by Equation (22). In Equation (22), ω represents an angular speed of the wheel, and "$R_{e,init}$" represents an initial value of a tire effective radius. "δ" is represented by Equation (23). In Equation (23), δs represents a detected value of the steering angle sensor, and $k_\delta$ represents a steering gear ratio.

$$\sum F_{y0} = \frac{mu^2}{R_{turn}} \quad (19)$$

$$R_{turn} \approx \frac{l_f + l_r}{\delta} \quad (20)$$

$$\sum F_{y0} = \frac{mu^2 \delta}{l_f + l_r} \quad (21)$$

$$u = avg(\omega R_{e,init}) \quad (22)$$

$$\delta = k_\delta \delta_S \quad (23)$$

Thus, assuming that the influence of dotted p is "e dotted p", the "e dotted p" is represented by the following Equation (24).

$$e_{\dot{p}} = \left(\frac{(I_x + I_1)t_{rr}}{2(t_{rf}^2 + t_{rr}^2)}\right) p \vec{p}$$

$$= \left(\frac{(I_x + I_1)t_{rr}}{2(t_{rf}^2 + t_{rr}^2)}\right)\left(\frac{h_0}{I_x}\right)\sum F_{y0}$$

$$= \left(\frac{h_0 t_{rr}}{2(t_{rf}^2 + t_{rr}^2)}\right)\left(1 + \frac{I_1}{I_x}\right)\sum F_{y0} \quad (24)$$

Equation (20) is described here. $R_{turn,l}$ is represented by Equation (25). Similarly, $R_{turn,r}$ is represented by Equation (26).

$$(\delta + \beta_{fl} - \beta_{rl}) R_{turn,l} = (l_f + l_r) \quad (25)$$

$$(\delta + \beta_{fr} - \beta_{rr}) R_{turn,r} = (l_f + l_r) \quad (26)$$

It can be assumed that $R_{turn}$ is sufficiently large as compared with the wheelbase of the vehicle and that both β and δ are sufficiently small. $R_{turn}$ is represented by Equation (27) with use of Equations (25) and (26). In a process of derivation of Equation (27), as represented by Equation (28), the product of differences in B between the front and rear wheels is sufficiently small between the right and left wheels of the vehicle and can be regarded as zero. Furthermore, as represented by Equation (29), f (B) obtained by subtracting the sum of β of the rear wheels from the sum of β of the front wheels of the vehicle is sufficiently small as compared with $R_{turn}$ and can be regarded as zero. Thus, "$R_{turn}$" is represented by Equation (20) (described earlier).

$$R_{turn} = \frac{R_{turn,l} + R_{turn,r}}{2} \quad (27)$$

-continued $$= \frac{l_f + l_r}{2}\left(\frac{1}{\delta + \beta_{fl} - \beta_{rl}} + \frac{1}{\delta + \beta_{fr} - \beta_{rr}}\right)$$

$$= \frac{l_f + l_r}{2}\left(\frac{(2\delta + f(\beta))}{\delta^2 + \delta(f(\beta)) + (\beta_{fl} - \beta_{rl})(\beta_{fr} - \beta_{rr})}\right)$$

$$= \frac{l_f + l_r}{\delta}\left(\frac{\left(\delta + \frac{f(\beta)}{2}\right)}{\delta + f(\beta)}\right)$$

$$\approx \frac{l_f + l_r}{\delta}$$

In the above description, "$R_{turn}$" is expressed by the actual steering angle δ. Note, however, that "$R_{turn}$" can also be suitably expressed with use of a yaw rate instead of the actual steering angle δ.

[Estimation of Ground Contact Load]

The longitudinal and lateral acceleration sensor 131 detects and outputs longitudinal acceleration and lateral acceleration of the vehicle. The (steering angle/yaw rate sensor) 132 detects and outputs a steering angle or a yaw rate of the vehicle. The wheel speed sensor 133 detects and outputs a wheel speed of the wheels of the vehicle. Furthermore, the network (described earlier) outputs various physical quantities related to the vehicle. The acquisition section (described earlier) thus acquires and outputs the physical quantity related to the vehicle.

The reference inertia load calculation section 111 calculates the reference inertia load $dF_{est}^{(k)}$ with use of the physical quantity that has been acquired by the acquisition section.

The correction value calculation section 112 calculates the inertia load correction value $dF_{Z0,corr}$ with use of the physical quantity that has been acquired by the acquisition section. Specifically, the correction value calculation section 112 calculates the inertia load correction value for correcting the influence of dotted p during turning in accordance with Equation (15) (described earlier).

The inertia load estimation section 110 obtains an estimated value of an inertia load $dF_{Z0,inertia}$ by adding the inertia load correction value calculated by the correction value calculation section 112 to the reference inertia load calculated by the reference inertia load calculation section 111. Specifically, the inertia load estimation section 110 obtains the estimated value of the inertia load in accordance with Equation (14) (described earlier).

The inertia load estimation section 110 supplies the inertia load $dF_{Z0,inertia}$ to the delaying section 142. The delaying section 142 outputs the inertia load, if necessary, by delaying the inertia load so that the inertia load is output with appropriate timing in accordance with the subsequent control. For example, the delaying section 142 delays the inertia load so that the inertia load is synchronized with a delay in moving average process which delay occurs in the road surface load estimation section 120 (described later). The adding section 143 combines the inertia load with a steady load $F_{Z0nom}$ that has been supplied from the steady load providing section 141. The sum of the steady load and the inertia load is supplied to the road surface load estimation section 120 and the adding section 144.

Meanwhile, the road surface load estimation section 120 outputs an estimated value of a road surface load. The road surface load estimation section 120 can output the estimated value of the road surface load with reference to the sum of the steady load and the inertia load. In this case, the estimated value of the road surface load with reference to the steady load and the inertia load is obtained.

The estimated value of the road surface load which estimated value has been supplied from the road surface load estimation section 120 is combined, by the adding section 144, with the above sum. In this case, the sum of the steady load, the inertia load, and the road surface load is obtained as an estimated value $Fz_0$ of the ground contact load of the vehicle.

Effects

In Embodiment 1, the physical quantity that can be acquired by the universal sensor is used to calculate the reference inertia load and calculate the inertia load correction value. This makes it possible to reduce sensor-related cost. A comparison between (a) an actual measured value of the ground contact load which actual measured value is found with use of a sensor, provided in the vehicle, for more directly detecting the ground contact load and (b) an estimated value of the ground contact load which estimated value is found in accordance with Embodiment 1 shows that Embodiment 1 makes it possible to obtain the estimated value of the ground contact load $F_{z0}$ which estimated value is so accurate as to substantially coincide with the actual measured value.

In Embodiment 1, it is possible to use a solution of a motion equation which solution is obtained by application of the minimum norm solution. Therefore, Embodiment 1 thus configured is more effective in estimation of the ground contact load with high accuracy and is also more effective in making a correction that allows such estimation to be applied to a wide range of running conditions of the vehicle.

In Embodiment 1, the road surface load is estimated with reference to the steady load and the estimated inertia load. Therefore, Embodiment 1 thus configured makes it possible to estimate the road surface load with higher accuracy, as compared with a case where the road surface load is estimated without reference to the steady load and the estimated inertia load.

Embodiment 2: Second Embodiment of Ground Contact Load Estimation Device

Another embodiment of the present invention will be described below. Note that for convenience, members having functions identical to those of the respective members described in Embodiment 1 are given respective identical reference numerals, and a description of those members is omitted.

(Correction of Influence of $a_z$, Dotted p, and Dotted q)

In Embodiment 2, an inertia load correction value $dF_{z0,corr}$ can be represented by Equation (30) below. The first term in large parentheses (the product of $K_a$ and a vector a) on the right side of Equation (30) corrects an error of each of $a_z$, dotted p, and dotted q which error is caused by a minimum norm solution. In Equation (30), the vector a is represented by Equation (31) below, and a vector p is represented by Equation (16) (described earlier).

$$\overrightarrow{dF_{z0,corr}} = \sum \mathcal{F}_{y0}\left(K_a \vec{a} + K_p\left(\frac{h_0 t_{rr}}{2(t_{rf}^2 + t_{rr}^2)}\right)\left(1 + \frac{I_1}{I_x}\right)\dot{p}\right) \quad (30)$$

$$\vec{a} = \begin{bmatrix} 1 & -1 & -\frac{t_{rf}}{t_{rr}} & \frac{t_{rf}}{t_{rr}} \end{bmatrix}^T \quad (31)$$

In Equation (30), $K_a$ is an adjustment parameter. $K_a$ can be determined by comparing an estimated value obtained by Equation (30) with an actual measured value and setting $K_a$ as appropriate so that the estimated value is substantially identical to the actual measured value in estimation of a ground contact load of a vehicle.

[Estimation of Ground Contact Load]

A longitudinal and lateral acceleration sensor 131 detects and outputs longitudinal acceleration and lateral acceleration of the vehicle. A (steering angle/yaw rate sensor) 132 detects and outputs a steering angle or a yaw rate of the vehicle. A wheel speed sensor 133 detects and outputs a wheel speed of wheels of the vehicle. Furthermore, a network (described earlier) outputs various physical quantities related to the vehicle. An acquisition section (described earlier) thus outputs a physical quantity related to the vehicle.

A reference inertia load calculation section 111 calculates a reference inertia load $dF_{est}^{(k)}$ with use of the physical quantity that has been acquired by the acquisition section. Specifically, the reference inertia load calculation section 111 calculates, in accordance with Equation (13) (described earlier), the reference inertia load as a solution to which the minimum norm solution is applied. For example, a system matrix section 301 supplies, to an adding section 303, the product of a matrix A (described earlier) and a previously calculated value of a ground contact load $dF_{est}^{(k-1)}$, and an input matrix section 302 supplies, to the adding section 303, the product of a matrix U (described earlier) and a matrix B. The adding section 303 combines these products so as to calculate the reference inertia load. The reference inertia load is supplied from the reference inertia load calculation section 111. A delaying section 304 (i) adjusts timing so that the reference inertia load to be supplied to the system matrix section 301 has a previously calculated value in the next calculation of the reference inertia load and (ii) outputs the reference inertia load that has been received by the delaying section 304.

A correction value calculation section 112 calculates the inertia load correction value $dF_{z0,corr}$ with use of the physical quantity that has been acquired by the acquisition section. Specifically, the correction value calculation section 112 calculates, in accordance with Equation (30), the inertia load correction value that corrects an influence of dotted p, $a_z$, and dotted q.

An inertia load estimation section 110 obtains an estimated value of an inertia load $dF_{z0,inertia}$ by adding the inertia load correction value calculated by the correction value calculation section 112 to the reference inertia load calculated by the reference inertia load calculation section 111. Specifically, the inertia load estimation section 110 obtains the estimated value of the inertia load in accordance with Equation (14) (described earlier).

The inertia load estimation section 110 supplies the inertia load $dF_{z0,inertia}$ to a delaying section 142. The delaying section 142 outputs the inertia load, if necessary, by delaying the inertia load so that the inertia load is output with appropriate timing in accordance with the subsequent control. For example, the delaying section 142 delays the inertia load so that the inertia load is synchronized with a delay in moving average process which delay occurs in a road surface load estimation section 120 (described later). An adding section 143 combines the inertia load with a steady load $F_{z0nom}$ that has been supplied from a steady load providing section 141. The sum of the steady load and the inertia load is supplied to the road surface load estimation section 120 and an adding section 144.

Meanwhile, the road surface load estimation section 120 outputs an estimated value of a road surface load. The road surface load estimation section 120 can output the estimated value of the road surface load with reference to the sum of the steady load and the inertia load. In this case, the estimated value of the road surface load with reference to the steady load and the inertia load is obtained.

The estimated value of the road surface load which estimated value has been supplied from the road surface load estimation section 120 is combined, by the adding section 144, with the above sum. In this case, the sum of the steady load, the inertia load, and the road surface load is obtained as an estimated value $Fz_0$ of the ground contact load of the vehicle.

According to Embodiment 2, the road surface load is estimated as described below. The following description will discuss a functional configuration and a logic of estimation of the road surface load in Embodiment 2.

[Functional Configuration of Road Surface Load Estimation Section]

Figure 8:
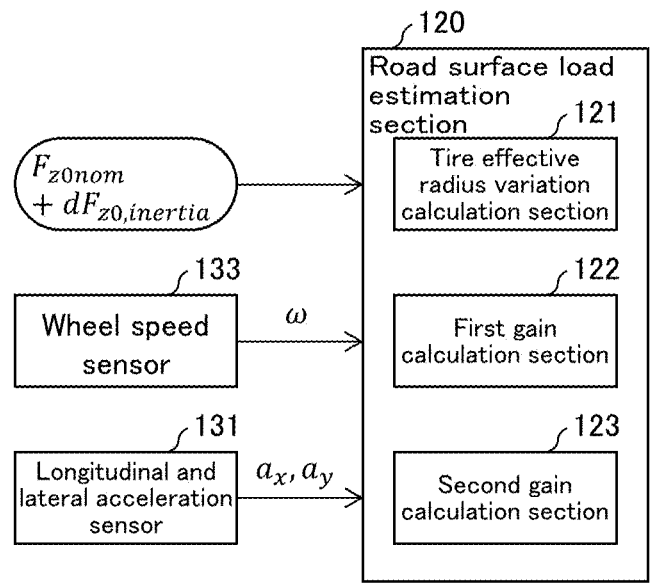
FIG. 8 is a block diagram illustrating an example of a functional configuration of a road surface load estimation section of Embodiment 2 of the present invention.

FIG. 8 is a block diagram illustrating an example of a functional configuration of a road surface load estimation section of Embodiment 2. According to Embodiment 2, the road surface load estimation section 120 has a tire effective radius variation calculation section 121, a first gain calculation section 122, and a second gain correction section 123 (see FIG. 8).

[Logic of Estimation of Road Surface Load]

A non-linear tire characteristic of the wheels of the vehicle is linearly approximated and is represented by Equations (51) and (52) below. In Equation (52), "$F_{z0}$" is the sum of the steady load and the inertia load as represented by Equation (53).

$$dF_{z0,road} = -a_1 dR_e \tag{51}$$

$$a_1 = a_{11}F_{z0} + a_{12} \tag{52}$$

$$Fz_0 = F_{z0nom} + dF_{z0,inertia} \tag{53}$$

In the above equations, $a_1$ represents a first gain, $a_{11}$ represents a first parameter, and $a_{12}$ represents a second parameter.

The first gain $a_1$ indicates rigidity of a wheel of the vehicle. The first gain $a_1$ is represented by a spring constant in a relationship of the spring constant to a ground contact load of a tire. The relationship is represented by a non-linear curve, but can be approximated to a linear expression as represented by Equation (52).

The first parameter $a_{11}$ and the second parameter $a_{12}$ are both adjustment parameters for applying the first gain $a_1$ to a wide range of conditions. The first parameter is represented by a slope of the linear expression obtained by the approximation described above, and the second parameter is represented by an intercept of the linear expression.

Figure 9:
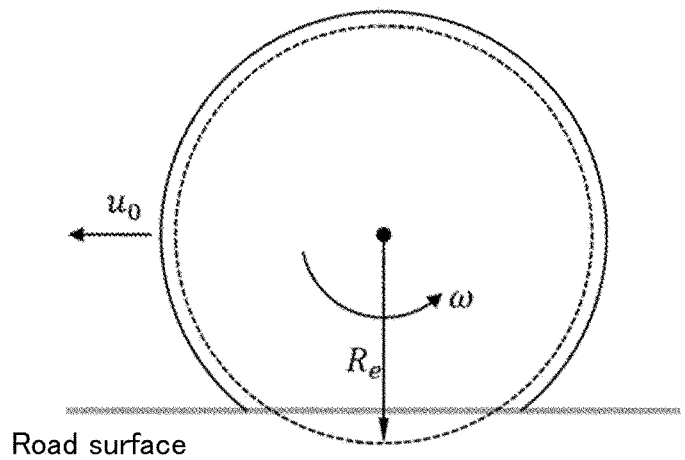
FIG. 9 is a view for describing a physical quantity related to a wheel of a vehicle.

FIG. 9 is a view for describing a physical quantity related to any wheel of a vehicle. In FIG. 9, $R_e$ represents an effective radius of the tire, $\omega$ represents an angular speed of the wheel, and $u_0$ represents a wheel center point speed parallel to a road surface. In consideration of a slip ratio of the tire, the effective radius $R_e$ is represented by Equation (54) below. Equation (55) below is derived from a total differential of Equation (54).

$$R_e = \frac{u_0}{\omega}(1+s) \tag{54}$$

$$\frac{dR_e}{R_e} = \frac{du_0}{u_0} + \frac{ds}{1+s} - \frac{d\omega}{\omega} \tag{55}$$

Assume that the slip ratio does not change. In this case, Equation (56) is derived from Equation (55), and Equation (57) is further derived. In Equation (57), $a_2$ represents a second gain. The second gain $a_2$ is a parameter for adjusting an influence of a variation in wheel angular speed on an estimation result. For example, the second gain can be determined by (i) comparing an actual measured value and an estimated value of the ground contact load of the vehicle which is running under a condition in which the wheel angular speed changes and (ii) setting the second gain as appropriate so that the estimated value is substantially equally effective against various running conditions.

$$\frac{dR_e}{R_e} = \tag{56}$$

$$\frac{du_0}{u_0} - \frac{d\omega}{\omega} = \frac{d\omega}{\omega}\left[\frac{du_0 \times \omega}{u_0 \times d\omega} - 1\right] = \frac{d\omega}{\omega}\left[\frac{du_0}{R_e \times d\omega}(1+s) - 1\right] = \frac{d\omega}{\omega} \times a_2$$

$$dR_e = a_2 R_e\left(\frac{d\omega}{\omega}\right) \tag{57}$$

$d\omega/\omega$ in parentheses in Equation (57) can be approximated as represented by Equation (58). In Equation (58), "movavg($\omega$)" represents a moving average of the wheel angular speed. Thus, Equation (59) is derived from Equation (57).

$$\frac{d\omega}{\omega} \approx \frac{\omega - movavg(\omega)}{movavg(\omega)} \tag{58}$$

$$dR_e = a_2 R_e\left(\frac{\omega - movavg(\omega)}{movavg(\omega)}\right) \tag{59}$$

Equation (60) is derived by substituting Equation (59) in Equation (51). The road surface load is calculated from Equation (60). Equation (60) includes movavg($\omega$).

$$dF_{z0,road} = -a_1 \times a_2 \times R_e\left(\frac{\omega - movavg(\omega)}{movavg(\omega)}\right) \tag{60}$$

The second gain $a_2$ can be represented by Equation (61) below. In Equation (61), $a_{21}$ represents a third parameter. The third parameter $a_{21}$ is an adjustment parameter that is similar to the second gain. In Equation (61), the third parameter results in the same as the second gain.

$$a_2 = a_{21} \tag{61}$$

The second gain can be expressed with use of not only the third parameter but also a further correction value for correcting an influence of a specific vehicle state on the tire. For example, the second gain can be represented by Equation (62).

$$a_2 = a_{21} \times \mathcal{F}_s \times \mathcal{F}_{jerk} \tag{62}$$

In Equation (62), $F_s$ represents a correction value for correcting an influence of the slip ratio, and $F_{jerk}$ represents a correction value for correcting an error caused by a jerk. In this case, the third parameter is an adjustment parameter for reducing an influence of a correction, made with use of these correction values, during running of the vehicle under a condition that is different from a running condition which is to be corrected with use of the correction values. $F_s$ and $F_{jerk}$ each can increase and decrease (i) a calculated value of a slip ratio-related value which calculated value is calculated by the second gain correction section (described later) or (ii) an acquired value of the jerk which acquired value is acquired by the acquisition section, or can substantially clear the calculated value or the acquired value in accordance with a predetermined threshold. In order to make such a correction, it is possible to calculate the road surface load from Equation (63).

$$dF_{z0,road} = -a_1 \times a_{21} \times \mathcal{F}_s \times \mathcal{F}_{jerk} \times R_e \left( \frac{\omega - movavg(\omega)}{movavg(\omega)} \right) \quad (63)$$

[Estimation of Road Surface Load]

The first gain calculation section 122 of the road surface load estimation section 120 calculates the first gain a with use of at least the steady load and the inertia load. The first gain $a_1$ is represented by rigidity (a spring constant) of a wheel (tire) of the vehicle as described earlier, and can be represented by a linear expression that is approximate to a non-linear curve of the spring constant with respect to the ground contact load. Here, the ground contact load is the sum of the steady load and the inertia load as described earlier. The first gain calculation section 122 substitutes the above sum in Equation (52) so as to calculate the first gain.

The second gain correction section 123 further acquires the jerk of the vehicle from the acquisition section. Specifically, the second gain correction section 123 acquires the jerk of the vehicle via a network such as CAN.

The second gain correction section 123 also calculates the slip ratio-related value of the vehicle from a value of the wheel speed sensor. Specifically, the second gain correction section 123 acquires a numerical value corresponding to $F_s$ in Equation (62).

Furthermore, the second gain correction section 123 corrects the second gain in accordance with at least the slip ratio-related value and the jerk. The second gain is assumed to be set as the adjustment parameter as described earlier. Specifically, the second gain correction section 123 (i) determines, in accordance with Equation (62), $F_s$ and $F_{jerk}$ that reduce an influence of the slip ratio and the jerk, and (ii) uses $F_s$ and $F_{jerk}$ to correct the second gain in accordance with Equation (62).

In a case where a change in slip ratio-related value is considered to have a great influence on the estimation result, it is possible to set $F_s$ so as to adjust such an influence. For example, $F_s$ is a coefficient by which the slip ratio-related value is multiplied. In a case where the slip ratio-related value is less than a predetermined value, $F_s$ can be 0. In a case where the slip ratio-related value is not less than the predetermined value, $F_s$ can be 1 so that the slip ratio-related value is adopted.

In a case where a change in jerk is considered to have a great influence on the estimation result, it is possible to set $F_{jerk}$ so as to adjust such an influence. For example, $F_{jerk}$ is a coefficient by which the jerk acquired is multiplied. In a case where the jerk is more than a predetermined value, $F_{jerk}$ can be 0. In a case where the jerk is not more than the predetermined value, $F_{jerk}$ can be 1 so that the jerk acquired is adopted.

As represented by Equation (62), the second gain correction section 123 calculates the second gain that has been corrected by multiplying $F_s$ and $F_{jerk}$ by the third parameter. The third parameter $a_{21}$ in Equation (61) and the third parameter $a_{21}$ in Equation (62) can be identical to or different from each other.

The tire effective radius variation calculation section 121 calculates the tire effective radius variation by multiplying a variation in wheel angular speed by the second gain. The variation in wheel angular speed is a numerical value including a variation value dω of the wheel angular speed ω. Specifically, the tire effective radius variation calculation section 121 calculates the tire effective radius variation by multiplying the terms (except $a_1$) on the right side of Equation (60).

The road surface load estimation section 120 estimates the road surface load by multiplying, by the first gain, the tire effective radius variation that has been calculated by the tire effective radius variation calculation section 121. Specifically, the road surface load estimation section 120 obtains an estimated value of the road surface load, in accordance with Equation (60), by multiplying the tire effective radius variation by the first gain.

The ground contact load estimation device 100 obtains an estimated value of the ground contact load $F_{z0}$ of the vehicle by adding together (i) the steady load, (ii) the inertia load that has been estimated by the inertia load estimation section 110, and (iii) the road surface load that has been estimated by the road surface load estimation section 120.

Effects

Embodiment 2 further brings about the effects below in addition to the effects of Embodiment 1 described earlier. According to Embodiment 2, it is possible to (i) estimate the road surface load of the vehicle with higher accuracy. Furthermore, by including such an estimated value of the road surface load, it is possible to estimate the ground contact load of the vehicle with much higher accuracy. Moreover, by correcting the second gain in accordance with a change in acceleration/deceleration of the wheel, it is possible to estimate the road surface load with much higher accuracy.

Embodiment 3: Embodiment of Control Device for Suspension

The following description will discuss an example in which a physical quantity estimation device in accordance with Embodiment 3 is applied to a control device for controlling a suspension of a vehicle. Note that for convenience, members having functions identical to those of the respective members described in Embodiments 1 and 2 are given respective identical reference numerals, and a description of those members is omitted.

A control device in accordance with Embodiment 3 (i) estimates a ground contact load acting on the vehicle that has the suspension and (ii) controls a damping force of the suspension in accordance with the ground contact load. The control device of Embodiment 3 can be configured as in the case of a publicly known control device of a suspension except that the control device of Embodiment 3 includes a ground contact load estimation device (described earlier) and controls the damping force of the suspension in accordance with the ground contact load that has been estimated by the ground contact load estimation device.

Figure 10:
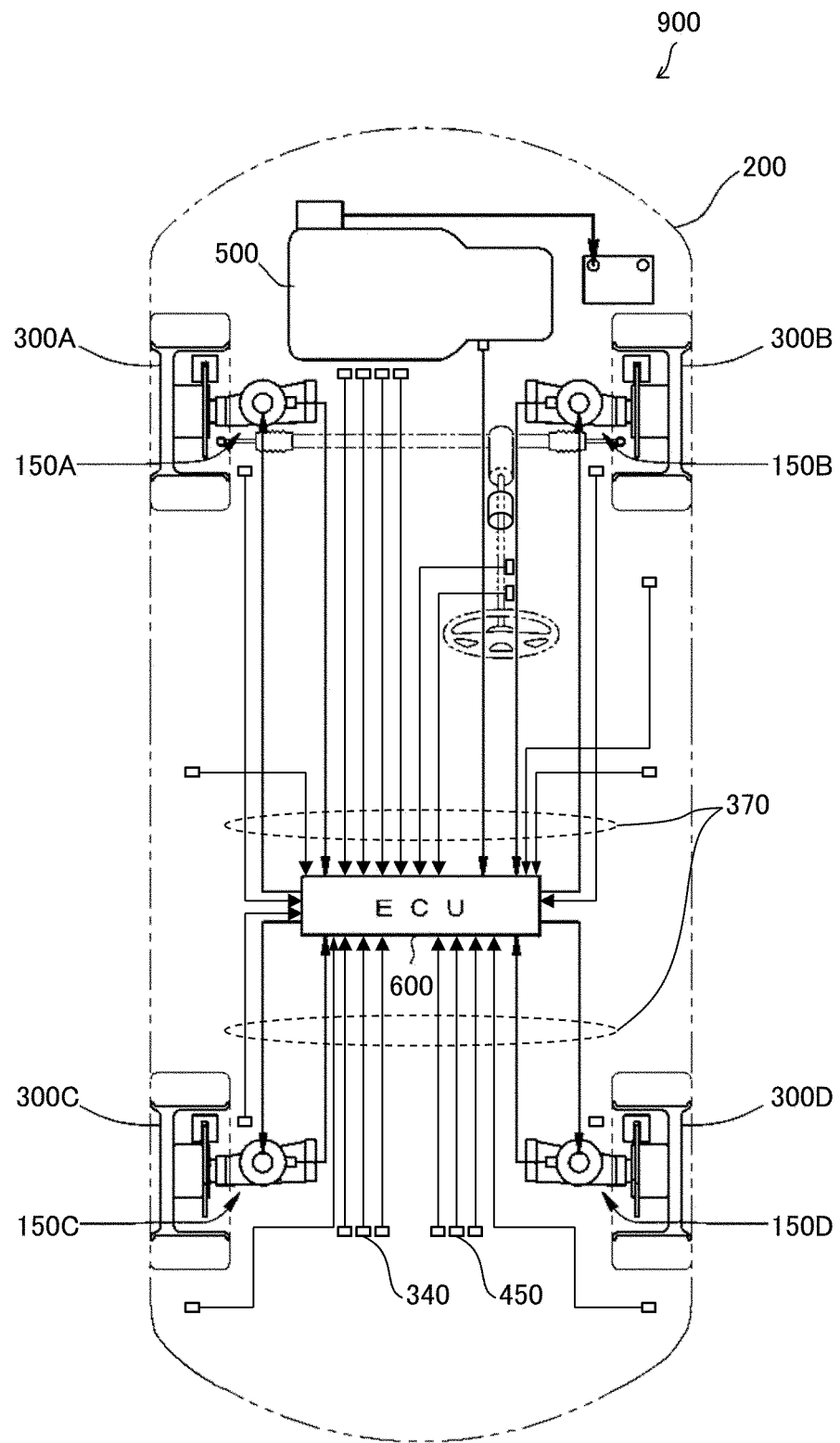
FIG. 10 is a view schematically illustrating an example of a configuration of a vehicle to which a ground contact load estimation device in accordance with an embodiment of the present invention is applied.

FIG. 10 is a view schematically illustrating an example of a configuration of a vehicle that has the ground contact load estimation device described above. As illustrated in FIG. 10, a vehicle 900 includes a suspension 150, a vehicle body 200, wheels 300, a vehicle speed sensor 450 that detects a vehicle speed (V), an engine 500, and an electronic control unit (ECU) 600. The ECU 600 corresponds to a processor (described earlier) and includes the ground contact load estimation device (described earlier).

Note that alphabets A to E in the reference signs each represent a position in the vehicle 900. A represents a left front position in the vehicle 900, B represents a right front position in the vehicle 900, C represents a left rear position in the vehicle 900, D represents a right rear position in the vehicle 900, and E represents a rear position in the vehicle 900.

Furthermore, the vehicle 900 has various sensors such as a longitudinal acceleration sensor 340 that detects acceleration in the longitudinal direction of the vehicle 900. Such a sensor corresponds to a universal sensor (described earlier). The vehicle 900 has a storage medium. The storage medium stores various pieces of information necessary for estimation of a physical quantity. Examples of such information include various physical quantities related to the vehicle, such as a wheel radius and a mass (vehicle weight) of the vehicle.

Via a controller area network (CAN) 370, respective output values of the various sensors are supplied to the ECU 600, and control signals are transmitted from the ECU 600 to respective sections. It is possible to newly provide the sensors in order to estimate the physical quantity (described later). However, from the viewpoint of cost, the sensors are preferably sensors that already exist in the vehicle 900.

According to Embodiment 3, the damping force of the suspension is controlled in accordance with an estimated value of the ground contact load of the vehicle which estimated value is as accurate as an actual measured value of the ground contact load of the vehicle. This makes it possible to sufficiently enhance running stability of the vehicle without the need to use any special sensor that is different from the universal sensor.

In Embodiment 3, the ground contact load that has been estimated in the control device is directly used to control the damping force of the suspension of the vehicle. According to an aspect of the present invention, the ground contact load thus estimated can be used to control various devices of the vehicle as in the case of the suspension. Examples of such devices include not only an ordinary suspension but also an electronically controlled suspension, a steering device, and an electronically controlled driving force transmission device. The ground contact load estimated can be used to control one or more of these devices of the vehicle. In control of these devices, an estimation result of the ground contact load can be used directly as in Embodiment 3 or indirectly to control those devices. Indirect use of the estimation result of the ground contact load is, for example, to convert the estimation result to another state quantity so as to use an estimated value of the state quantity obtained by the conversion to control the other device(s). By using the estimated value of the ground contact load (described earlier) to control the other device(s), as in the case of Embodiment 3, it is possible to sufficiently or further enhance running stability of the vehicle without the need to use any special sensor that is different from the universal sensor.

Software Implementation Example

Control blocks of the ground contact load estimation device 100 (particularly, the inertia load estimation section 110 and the road surface load estimation section 120) can be realized by a logic circuit (hardware) provided in an integrated circuit (IC chip) or the like or can be alternatively realized by software.

In the latter case, the ground contact load estimation device 100 includes a computer that executes instructions of a program that is software realizing the foregoing functions. The computer not only includes, for example, at least one processor but also includes a computer-readable storage medium in which the program is stored. An object of the present invention can be achieved by the processor reading and executing, in the computer, the program stored in the storage medium. Examples of the processor include a central processing unit (CPU).

Examples of the storage medium encompass "a non-transitory tangible medium" such as not only a read only memory (ROM) but also a tape, a disk, a card, a semiconductor memory, and a programmable logic circuit. The computer may further include a random access memory (RAM) or the like in which the program is loaded.

The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

Variation

In an aspect of the present invention, a ground contact load can be found by, for example, a method disclosed in paragraph [0151] of Japanese Patent Application Publication Tokukai No. 2008-074184.

In Embodiment 1 (described earlier), the members that are different from the inertia load estimation section 110 can be omitted as appropriate in accordance with accuracy with which the ground contact load is expected to be estimated. For example, it is possible to omit the road surface load estimation section 120 and the adding section 144 in Embodiment 1. In this case, the sum of the steady load and the inertia load is the estimated value of the ground contact load.

In Embodiment 2 (described earlier), part of the members can be omitted as appropriate in accordance with accuracy with which the ground contact load is expected to be estimated. For example, in Embodiment 2, it is possible to omit the second gain calculation section in a case where the second gain is not corrected.

Alternatively, it is possible to omit or integrate part of calculation processes as appropriate in order to achieve, for example, a simpler calculation process. For example, the road surface load can be calculated in Embodiment 2 by (i) finding a value obtained by multiplying the first gain $a_1$ and the second gain $a_2$ and (ii) applying a resultant gain value to, for example, Equation (60) (described earlier).

Aspects of the present invention can also be expressed as follows:

As is clear from the above description, a ground contact load estimation device (100) of an embodiment of the present invention is a ground contact load estimation device for estimating a ground contact load of a vehicle (900), the ground contact load estimation device including: an acquisition section configured to acquire a physical quantity related to the vehicle; and an inertia load estimation section (110) including (i) a reference inertia load calculation section (111) configured to calculate a reference inertia load with use of the physical quantity that has been acquired by the acquisition section and (ii) a correction value calculation section (112) configured to calculate an inertia load correction value with use of the physical quantity that has been acquired by the acquisition section, the inertia load estimation section being configured to estimate an inertia load by adding the inertia load correction value to the reference inertia load.

The configuration not only makes it possible to reduce sensor-related cost but also makes it possible to estimate a ground contact load of a vehicle with sufficiently high accuracy.

According to an embodiment of the present invention, the acquisition section can acquire, as the physical quantity, a value of a longitudinal acceleration sensor (131) that acquires longitudinal acceleration of the vehicle, a value of a lateral acceleration sensor (131) that acquires lateral acceleration of the vehicle, a value of a wheel speed sensor (133) that acquires a wheel angular speed of the vehicle, a value of a turning information sensor that acquires turning information of the vehicle, a mass of the vehicle, a gravitational center height of the vehicle, a rolling inertia moment, a pitching inertia moment, a front axle intercentroid distance of the vehicle, a rear axle intercentroid distance of the vehicle, a front tread length of the vehicle, and a rear tread length of the vehicle. Furthermore, the reference inertia load calculation section can calculate the reference inertia load in accordance with a model of the vehicle with use of the value of the longitudinal acceleration sensor, the value of the lateral acceleration sensor, the mass of the vehicle, the gravitational center height of the vehicle, the rolling inertia moment, the pitching inertia moment, the front axle intercentroid distance of the vehicle, the rear axle intercentroid distance of the vehicle, the front tread length, and the rear tread length. Moreover, the correction value calculation section can calculate the inertia load correction value with use of the mass of the vehicle, the gravitational center height of the vehicle, the value of the wheel speed sensor, the value of the turning information sensor, the rolling inertia moment, the front tread length, and the rear tread length.

The configuration makes it possible to acquire the physical quantity with use of a universal sensor or estimate the ground contact load with sufficiently high accuracy in accordance with the physical quantity that is specific to the vehicle.

According to an embodiment of the present invention, the model can be a model of a solution of a motion equation represented by a linear system, the solution being obtained by application of a minimum norm solution.

The configuration makes it possible to obtain an estimated value of the ground contact load in accordance with an appropriate motion equation and with use of a solution to which an appropriate correction has been made. The configuration is therefore more effective in order to obtain, with high accuracy, an estimated value of the ground contact load which estimated value is applied to a wide range of running conditions of the vehicle.

According to an embodiment of the present invention, the turning information sensor can be a yaw rate sensor or a steering angle sensor (132).

The configuration is more effective in order to estimate the ground contact load of the vehicle with high accuracy with use of the physical quantity that is acquired with use of a universal sensor.

According to an embodiment of the present invention, the acquisition section can (i) include a wheel speed sensor that acquires the wheel angular speed of the vehicle and (ii) acquire the physical quantity including the wheel angular speed, a steady load of the vehicle, and an inertia load of the vehicle, and the ground contact load estimation device can further include a road surface load estimation section (120) configured to estimate a road surface load of the vehicle. The road surface load estimation section can include: a first gain calculation section (122) configured to use at least the steady load of the vehicle and the inertia load of the vehicle to calculate a first gain indicative of at least rigidity of a wheel (300) of the vehicle; and a tire effective radius variation calculation section (121) configured to calculate a tire effective radius variation by multiplying a variation in wheel angular speed by a second gain for reducing an influence of the variation in wheel angular speed on an estimation result, and the road surface load estimation section can estimate the road surface load by multiplying the tire effective radius variation by the first gain. The ground contact load estimation device can estimate the ground contact load of the vehicle by adding together (i) the inertia load that has been estimated by the inertia load estimation section and (ii) the road surface load that has been estimated by the road surface load estimation section.

The configuration makes it possible to acquire the physical quantity with use of a universal sensor or estimate the road surface load of the vehicle with sufficiently high accuracy in accordance with the physical quantity that is specific to the vehicle, and also to estimate the ground contact load including such a road surface load and having higher accuracy.

According to an embodiment of the present invention, the acquisition section can further acquire a jerk of the vehicle, and the road surface ground contact load estimation section can further include a second gain correction section (123) configured to correct the second gain. The second gain correction section can calculate a slip ratio-related value of the vehicle from the value of the wheel speed sensor so as to correct the second gain in accordance with at least the slip ratio-related value and the jerk.

The configuration is more effective in order to estimate the road surface load with higher accuracy.

A control device of an embodiment of the present invention is a control device (ECU 600) for estimating a ground contact load acting on a vehicle, and directly or indirectly using the ground contact load to control one or more other devices of the vehicle. The control device includes: an acquisition section configured to acquire a physical quantity related to the vehicle; and an inertia load estimation section including (i) a reference inertia load calculation section configured to calculate a reference inertia load with use of the physical quantity that has been acquired by the acquisition section and (ii) a correction value calculation section configured to calculate an inertia load correction value with use of the physical quantity that has been acquired by the acquisition section, the inertia load estimation section being configured to estimate an inertia load by adding the inertia load correction value to the reference inertia load.

The configuration not only makes it possible to reduce sensor-related cost but also makes it possible to control the other device(s) that control(s) a driving state of the vehicle in accordance with the ground contact load that has been estimated with sufficiently high accuracy. This makes it possible to sufficiently enhance running stability of the vehicle.

According to an embodiment of the present invention, the one or more other devices can be one or more devices selected from the group consisting of an electronically controlled suspension, a steering device, and an electronically controlled driving force transmission device.

The configuration is more effective in order to enhance running stability of the vehicle.

A ground contact load estimation method of an embodiment of the present invention is a ground contact load estimation method for estimating a ground contact load of a vehicle, the ground contact load estimation method including the steps of: acquiring a physical quantity related to the vehicle; calculating a reference inertia load with use of the physical quantity acquired; calculating an inertia load correction value with use of the physical quantity acquired; and estimating an inertia load by adding the inertia load correction value to the reference inertia load.

The configuration not only makes it possible to reduce sensor-related cost but also makes it possible to estimate a ground contact load of a vehicle with sufficiently high accuracy.

REFERENCE SIGNS LIST

- 100 Ground contact load estimation device
- 110 Inertia load estimation section
- 111 Reference inertia load calculation section
- 112 Correction value calculation section
- 120 Road surface load estimation section
- 121 Tire effective radius variation calculation section
- 122 First gain calculation section
- 123 Second gain correction section
- 131 Lateral acceleration sensor
- 132 Steering angle/yaw rate sensor
- 133 Wheel speed sensor
- 141 Steady load providing section
- 142, 304 Delaying section
- 143, 144, 303 Adding section
- 200 Vehicle body
- 300 Wheel
- 301 System matrix section
- 302 Input matrix section
- 340 Longitudinal acceleration sensor
- 450 Vehicle speed sensor
- 500 Engine
- 600 ECU
- 900 Vehicle

The invention claimed is:

1. A ground contact load estimation device for estimating a ground contact load of a vehicle,
said ground contact load estimation device comprising processing circuitry and a memory:
the processing circuitry including:
acquisition circuitry configured to acquire, as a physical quantity related to the vehicle, a value of a longitudinal acceleration sensor that acquires longitudinal acceleration of the vehicle, a value of a lateral acceleration sensor that acquires lateral acceleration of the vehicle, a value of a wheel speed sensor that acquires a wheel angular speed of the vehicle, a value of a turning information sensor that acquires turning information of the vehicle, a mass of the vehicle, a gravitational center height of the vehicle, a rolling inertia moment, a pitching inertia moment, a front axle intercentroid distance of the vehicle, a rear axle intercentroid distance of the vehicle, a front tread length of the vehicle, and a rear tread length of the vehicle; and
inertia load estimation circuitry including (i) reference inertia load calculation circuitry configured to calculate a reference inertia load in accordance with a model of the vehicle with use of the value of the longitudinal acceleration sensor, the value of the lateral acceleration sensor, the value of the wheel speed sensor, the mass of the vehicle, the gravitational center height of the vehicle, the rolling inertia moment, the pitching inertia moment, the front axle intercentroid distance of the vehicle, the rear axle intercentroid distance of the vehicle, the front tread length, and the rear tread length, each of which has been acquired by the acquisition circuitry, and (ii) correction value calculation circuitry configured to calculate an inertia load correction value with use of the mass of the vehicle, the gravitational center height of the vehicle, the value of the wheel speed sensor, the value of the turning information sensor, the rolling inertia moment, the front tread length, and the rear tread length, each of which has been acquired by the acquisition circuitry, the inertia load estimation circuitry being configured to estimate an inertia load by adding the inertia load correction value to the reference inertia load, the inertia load meaning a variation in ground contact load due to an effect of turning of the vehicle and an effect of acceleration/deceleration of the vehicle,
wherein the ground contact load estimation device controls one or more of a suspension, an electronically controlled suspension, a steering device, and an electronically controlled driving force transmission device,
wherein the ground contact load device is configured for adjusting one or more of a braking force, a driving force, and a transmission driving force, and a suspension damping force.

2. The ground contact load estimation device as set forth in claim 1, wherein the model is a model of a solution of a motion equation represented by a linear system, the solution being obtained by application of a minimum norm solution.

3. The ground contact load estimation device as set forth in claim 1, wherein the turning information sensor is a yaw rate sensor or a steering angle sensor.

4. The ground contact load estimation device as set forth in claim 1, wherein
the acquisition circuitry (i) includes a wheel speed sensor that acquires the wheel angular speed of the vehicle and (ii) acquires the physical quantity including the wheel angular speed, a steady load of the vehicle, and an inertia load of the vehicle,
said ground contact load estimation device further comprising a road surface load estimation circuitry configured to estimate a road surface load of the vehicle,
the road surface load estimation circuitry including:
first gain calculation circuitry configured to use at least the steady load of the vehicle and the inertia load of the vehicle to calculate a first gain indicative of at least rigidity of a wheel of the vehicle; and
tire effective radius variation calculation circuitry configured to calculate a tire effective radius variation by multiplying a variation in wheel angular speed by a second gain for reducing an influence of the variation in wheel angular speed on an estimation result,
the road surface load estimation circuitry estimating the road surface load by multiplying the tire effective radius variation by the first gain, and the ground contact load estimation device estimating the ground contact load of the vehicle by adding together (i) the inertia load that has been estimated by the inertia load estimation circuitry and (ii) the road surface load that has been estimated by the road surface load estimation circuitry.

5. The ground contact load estimation device as set forth in claim 4, wherein
the acquisition circuitry further acquires a jerk of the vehicle,
the road surface load estimation circuitry further includes second gain correction circuitry configured to correct the second gain, and
the second gain correction circuitry uses the value of the wheel speed sensor to calculate a slip ratio-related value of the vehicle so as to correct the second gain in accordance with at least the slip ratio-related value and the jerk.

6. A control device comprising the ground contact load estimation device recited in claim 1,
said control device directly or indirectly using a ground contact load, estimated by the contact load estimation device, to control one or more other devices of the vehicle.

7. The control device as set forth in claim 6, wherein the one or more other devices are one or more devices selected from the group consisting of an electronically controlled suspension, a steering device, and an electronically controlled driving force transmission device.

8. The ground contact load estimation device as set forth in claim 2, wherein the turning information sensor is a yaw rate sensor or a steering angle sensor.

9. The ground contact load estimation device as set forth in claim 2, wherein
the acquisition circuitry (i) includes a wheel speed sensor that acquires the wheel angular speed of the vehicle and (ii) acquires the physical quantity including the wheel angular speed, a steady load of the vehicle, and an inertia load of the vehicle,
said ground contact load estimation device further comprising road surface load estimation circuitry configured to estimate a road surface load of the vehicle,
the road surface load estimation circuitry including:
first gain calculation circuitry configured to use at least the steady load of the vehicle and the inertia load of the vehicle to calculate a first gain indicative of at least rigidity of a wheel of the vehicle; and
tire effective radius variation calculation circuitry configured to calculate a tire effective radius variation by multiplying a variation in wheel angular speed by a second gain for reducing an influence of the variation in wheel angular speed on an estimation result,
the road surface load estimation circuitry estimating the road surface load by multiplying the tire effective radius variation by the first gain, and
the ground contact load estimation device estimating the ground contact load of the vehicle by adding together (i) the inertia load that has been estimated by the inertia load estimation circuitry and (ii) the road surface load that has been estimated by the road surface load estimation circuitry.

10. The ground contact load estimation device as set forth in claim 9, wherein
the acquisition circuitry further acquires a jerk of the vehicle,
the road surface load estimation circuitry further includes second gain correction circuitry configured to correct the second gain, and
the second gain correction circuitry uses the value of the wheel speed sensor to calculate a slip ratio-related value of the vehicle so as to correct the second gain in accordance with at least the slip ratio-related value and the jerk.

11. A control device comprising the ground contact load estimation device recited in claim 2,
said control device directly or indirectly using a ground contact load, estimated by the contact load estimation device, to control one or more other devices of the vehicle.

12. The control device as set forth in claim 11, wherein the one or more other devices are one or more devices selected from the group consisting of an electronically controlled suspension, a steering device, and an electronically controlled driving force transmission device.

13. The ground contact load estimation device as set forth in claim 8, wherein
the acquisition circuitry (i) includes a wheel speed sensor that acquires the wheel angular speed of the vehicle and (ii) acquires the physical quantity including the wheel angular speed, a steady load of the vehicle, and an inertia load of the vehicle,
said ground contact load estimation device further comprising road surface load estimation circuitry configured to estimate a road surface load of the vehicle,
the road surface load estimation circuitry including:
first gain calculation circuitry configured to use at least the steady load of the vehicle and the inertia load of the vehicle to calculate a first gain indicative of at least rigidity of a wheel of the vehicle; and
tire effective radius variation calculation circuitry configured to calculate a tire effective radius variation by multiplying a variation in wheel angular speed by a second gain for reducing an influence of the variation in wheel angular speed on an estimation result,
the road surface load estimation circuitry estimating the road surface load by multiplying the tire effective radius variation by the first gain, and
the ground contact load estimation device estimating the ground contact load of the vehicle by adding together (i) the inertia load that has been estimated by the inertia load estimation circuitry and (ii) the road surface load that has been estimated by the road surface load estimation circuitry.

14. The ground contact load estimation device as set forth in claim 13, wherein
the acquisition circuitry further acquires a jerk of the vehicle,
the road surface load estimation circuitry further includes second gain correction circuitry configured to correct the second gain, and
the second gain correction circuitry uses the value of the wheel speed sensor to calculate a slip ratio-related value of the vehicle so as to correct the second gain in accordance with at least the slip ratio-related value and the jerk.

15. A control device comprising the ground contact load estimation device recited in claim 8,
said control device directly or indirectly using a ground contact load, estimated by the contact load estimation device, to control one or more other devices of the vehicle.

16. The control device as set forth in claim 15, wherein the one or more other devices are one or more devices selected from the group consisting of an electronically controlled suspension, a steering device, and an electronically controlled driving force transmission device.

17. A control device comprising a ground contact load estimation device recited in claim 9,
said control device directly or indirectly using a ground contact load, estimated by the contact load estimation device, to control one or more other devices of the vehicle.

18. The control device as set forth in claim 17, wherein the one or more other devices are one or more devices selected from the group consisting of an electronically controlled suspension, a steering device, and an electronically controlled driving force transmission device.

19. A control device comprising the ground contact load estimation device recited in claim 13,
said control device directly or indirectly using a ground contact load, estimated by the contact load estimation device, to control one or more other devices of the vehicle.

20. A ground contact load estimation method for estimating a ground contact load of a vehicle,
said ground contact load estimation method comprising:
acquiring, as a physical quantity related to the vehicle, a value of a longitudinal acceleration sensor that acquires longitudinal acceleration of the vehicle, a value of a lateral acceleration sensor that acquires lateral acceleration of the vehicle, a value of a wheel speed sensor that acquires a wheel angular speed of the vehicle, a value of a turning information sensor that acquires turning information of the vehicle, a mass of the vehicle, a gravitational center height of the vehicle, a rolling inertia moment, a pitching inertia moment, a front axle intercentroid distance of the vehicle, a rear axle intercentroid distance of the vehicle, a front tread length of the vehicle, and a rear tread length of the vehicle;
calculating a reference inertia load in accordance with a model of the vehicle with use of the value of the longitudinal acceleration sensor, the value of the lateral acceleration sensor, the value of the wheel speed sensor, the mass of the vehicle, the gravitational center height of the vehicle, the rolling inertia moment, the pitching inertia moment, the front axle intercentroid distance of the vehicle, the rear axle intercentroid distance of the vehicle, the front tread length, and the rear tread length, each of which has been acquired;
calculating an inertia load correction value with use of the mass of the vehicle, the gravitational center height of the vehicle, the value of the wheel speed sensor, the value of the turning information sensor, the rolling inertia moment, the front tread length, and the rear tread length, each of which has been acquired; and
estimating an inertia load by adding the inertia load correction value to the reference inertia load, the inertia load meaning a variation in ground contact load due to an effect of turning of the vehicle and an effect of acceleration/deceleration of the vehicle,
wherein the ground contact load estimation device controls one or more of a suspension, an electronically controlled suspension, a steering device, and an electronically controlled driving force transmission device,
wherein the ground contact load device is configured for adjusting one or more of a braking force, a driving force, and a transmission driving force, and a suspension damping force.

* * * * *